United States Patent [19]
Timmermans

[11] Patent Number: 6,134,200
[45] Date of Patent: Oct. 17, 2000

[54] METHOD AND APPARATUS FOR RECORDING A MAIN DATA FILE AND A CONTROL FILE ON A RECORD CARRIER, AND APPARATUS FOR READING THE RECORD CARRIER

[75] Inventor: Jozef M. K. Timmermans, Hasselt, Belgium

[73] Assignee: U.S. Philips Corporation, New York, N.Y.

[21] Appl. No.: 08/226,225

[22] Filed: Apr. 11, 1994

Related U.S. Application Data

[63] Continuation of application No. 07/856,216, filed as application No. PCT/NL91/00175, Sep. 18, 1991, abandoned.

[30] Foreign Application Priority Data

Sep. 19, 1990 [EP] European Pat. Off. .............. 90202487
Sep. 27, 1990 [NL] Netherlands ........................... 9002108

[51] Int. Cl.[7] .................................................. G11B 5/09
[52] U.S. Cl. ............................ 369/47; 369/48; 369/58; 360/48
[58] Field of Search ................................ 369/47, 48, 58, 369/59, 54; 360/48, 27

[56] References Cited

U.S. PATENT DOCUMENTS

| | | | |
|---|---|---|---|
| 3,681,524 | 8/1972 | Nicholls | 360/72.2 |
| 4,663,678 | 5/1987 | Blum | 360/72.2 |
| 4,796,223 | 1/1989 | Sugita et al. | 360/69 |
| 4,914,515 | 4/1990 | Van Luyt . | |
| 5,200,944 | 4/1993 | Souma | 369/48 |
| 5,341,356 | 8/1994 | Dieleman et al. | 369/58 |

FOREIGN PATENT DOCUMENTS

| | | |
|---|---|---|
| 0037487 A1 | 10/1981 | European Pat. Off. . |
| 2507045 | 12/1982 | France . |
| 58-012182 | 1/1983 | Japan . |
| 62-008367 | 1/1987 | Japan . |
| 8601005 | 11/1987 | Netherlands . |

OTHER PUBLICATIONS

Preston J.M., Compact Disc–Interactive A Designer's Overview, 1987, pp. 109–142.

Image Technology, Journal of The BKSTS, May 1990, vol. 27, No. 5, pp. 186–187.

*Primary Examiner*—Thang V. Tran
*Attorney, Agent, or Firm*—Michael E Belk

[57] ABSTRACT

Record carrier on which a main data file and a control file have been recorded, method of and device for recording the main data file and the control file, and device for reading the record carrier. A record carrier (184) is described on which main data files (TV/4, TV, . . . , 256 TV) and a control file (BB; IIDB) have been recorded, the control data in the control file being intended for controlling the reproduction of representations of the main data in the main data file during or after read-out of the main data file. The main data file and the control file are derived from a main data signal and a control data signal respectively in accordance with the same formatting and coding rules. The control data signal comprises packets (151) of n identical control data bit groups (150), n being an integer greater than or equal to 2.

25 Claims, 16 Drawing Sheets

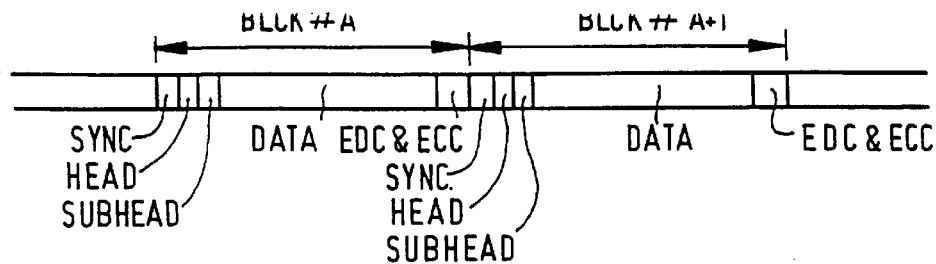
FIG. 19
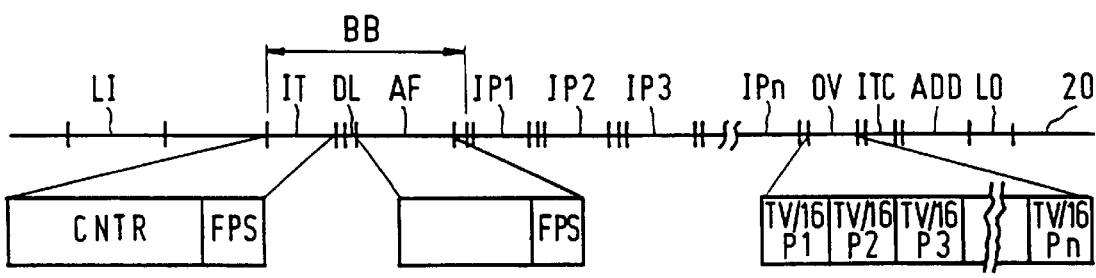
FIG. 20
BLCK #1:  | Y01 Y03 Y0 |
BLCK #2:  | 5 Y07 Y09 Y |
BLCK #3:  | 11 Y13 Y15 |
BLCK #4:  | C01 C05 C0 |
BLCK #5:  | 9 C13 Y02 Y |
BLCK #6:  | 04 Y06 Y08 |
BLCK #7:  | Y10 Y12 Y1 |
BLCK #8:  | 4 Y16 C03 C |
BLCK #9:  | 07 C11 C15 |
FIG. 21

BLCK #1:   |Y01 Y03 Y05 Y07 Y09 Y|
BLCK #2:   |11 Y13 Y15 Y17 Y19 Y21|
BLCK #3:   |1 Y23 Y25 Y27 Y29 Y31 1|
BLCK #4:   |C01 C05 C09 C13 C17 C|
BLCK #5:   |21 C25 C29 Y02 Y04 Y0|
BLCK #6:   |6 Y08 Y10 Y12 Y14 Y16|
BLCK #7:   |Y18 Y20 Y22 Y24 Y26 Y|
BLCK #8:   |28 Y30 Y32 C03 C07 C11|
BLCK #9:   |1 C15 C19 C23 C27 C31 |

BLCK #1: | Y01 Y03 Y05 Y07 Y09 Y11 Y13 Y15 Y17 Y19 Y21 |

BLCK #2: | 1 Y23 Y25 Y27 Y29 Y31 Y33 Y35 Y37 Y39 Y41 Y |

BLCK #3: | 43 Y45 Y47 Y49 Y51 Y53 Y55 Y57 Y59 Y61 Y63 |

BLCK #4: | C01 C05 C09 C13 C17 C21 C25 C29 C33 C37 C41 |

BLCK #5: | 1 C45 C49 C53 C57 C61 Y02 Y04 Y06 Y08 Y10 Y |

BLCK #6: | 12 Y14 Y16 Y18 Y20 Y22 Y24 Y26 Y28 Y30 Y32 |

BLCK #7: | Y34 Y36 Y38 Y40 Y42 Y44 Y46 Y48 Y50 Y52 Y5 |

BLCK #8: | 4 Y56 Y58 Y60 Y62 Y64 C03 C07 C11 C15 C19 C |

BLCK #9: | 23 C27 C31 C35 C39 C43 C47 C51 C55 C59 C63 |

FIG. 24

METHOD AND APPARATUS FOR RECORDING A MAIN DATA FILE AND A CONTROL FILE ON A RECORD CARRIER, AND APPARATUS FOR READING THE RECORD CARRIER

This is a continuation of the application Ser No. 07/856,216, Filed Jun. 30, 1992 now abandon.

BACKGROUND OF THE INVENTION

The invention relates to a record carrier on which a main data file and a control file have been recorded, the control data in the control file being intended for controlling the reproduction of representations of main data in the main data file during or after read-out of the main data file, the main data file and the control data file being derived from a main data signal and a control data signal respectively in conformity with the same predetermined formatting and encoding rules.

The invention further relates to a method of recording a main data file and a control file on a record carrier, in which prior to recording the main data file is derived from a main data signal in accordance with predetermined formatting and coding rules and in which the control file is derived from a control data signal in accordance with the same formatting and coding rules.

The invention further relates to a device for recording files on a record carrier, the device comprising means for deriving from a main data signal and a control data signal, a main data file to be recorded and a control data file to be recorded respectively in accordance with predetermined formatting and encoding rules which are identical for both files.

The invention further relates to a device for reading said record carrier, which device comprises means for reading the recorded files, decoding and deformatting means for recovering in conformity with predetermined decoding and deformatting rules the main data signal and the control data signal from the files thus read, a signal processing unit coupled to the decoding and deformatting means to process the main data signal, and a control unit coupled to the decoding and deformatting means to receive the control signal.

Such a record carrier and method and such devices are known, inter alia from the book "Compact Disc Interactive, a designer overview", edited by Philips International and published by Kluwer (ISBN 9090121219).

This book describes the so-called CDI system, which enables main data files, for example picture files, to be recorded on a Compact Disc, a picture data signal being formatted and encoded in accordance with the CD-I standard prior to recording. Control files, in the form of application programs, are also recorded. Prior to recording the control data signal is converted into the control file in accordance with the same formatting and encoding rules as applied in the conversion of the picture information signal into the main data file. The picture data file thus recorded can be read and representations of the information in the picture data file can be reproduced by means of a so-called CD-I player. The application program is then read first. This application program contains the control information necessary for controlling the reproduction of the representations.

The picture data file is read at a high bit rate, which has the advantage of a short read-out time for the picture data file. However, the high bit rate during reading also means that the control file becomes available at the same high bit rate. Since it is customary that a CD-I player comprises a computer system for processing both the main data file and the control file this does not pose a problem.

The use of such a computer system has the advantage that the CD-I player can be used for a variety of purposes. However, a drawback is that such a computer system is rather expensive. If the CD-I system is used exclusively for storing on a record carrier specific information, such as for example picture information originating from photographic negatives or slides, it may be desirable to have a dedicated read device, which is capable only of reading record carriers on which said specific information has been recorded. For processing the information from the main data file it is then preferred to use a dedicated and hence cheaper data processing unit rather than a computer system.

However, a problem which is then encountered is that a control unit must be used which is capable of reading in the control data from the control file, which is presented at a high bit rate. However, the control functions to be performed by said control unit do not require the use of a control unit with a high signal-processing speed, which means that a control unit with a high signal-processing speed, which is expensive, has to be used merely for reading in the control data.

SUMMARY OF THE INVENTION

It is an object of the invention to provide means enabling a comparatively cheap dedicated device for reading the record carrier to be obtained.

With respect to the record carrier this object is achieved in that the control data signal comprises packets of n identical control data bit groups, n being an integer greater than or equal to 2.

With respect to the method said object is achieved in that for deriving the control file a control data signal is employed which comprises packets of n identical control data bit groups each, n being an integer greater than or equal to two.

With respect to the device for recording said object is achieved in that the device comprises means for supplying a control data signal comprising n consecutive identical control data bit groups, n being an integer greater than or equal to two.

With respect to the device for reading said object is achieved in that the control unit comprises selection means for selecting m control data bit groups for each packet received, m being smaller than n.

Recording the control data in the control file as packets of identical control data bit groups substantially reduces the amount of control data becoming available per unit of time during reading. Selecting one bit group for each packet or a limited number of bit groups for each packet significantly reduces the required processing speed of the control unit while reading-in the control data, which enables a control unit having a low processing speed and thus a cheap control unit to be used.

An attractive embodiment of the device for reading the record carrier is characterized in that the selection means comprise clock extraction means for deriving a clock signal having a frequency related to the packet repetition frequency on the basis of one of the recovered signals, synchronization means for synchronizing the clock signals with the packets read, and means for reading-in at least one control data bit group per packet in synchronism with the clock signal.

A reliable synchronisation of the clock signal with the packets can be obtained by using an embodiment of the record carrier which is characterized in that the packets are arranged in frames in the control signal and the frames are arranged in data blocks of predetermined length, each block comprising a block synchronization section, each frame starting at a predetermined position relative to the block synchronization section.

An embodiment of a device for reading this record carrier is characterized in that the synchronizing means comprise a block synchronization detector, for detecting block synchronization sections in data blocks accommodating the data of the frames.

When the last-mentioned embodiment of the record carrier is used it is to be preferred to arrange bit groups not containing control data for controlling the reproduction at the beginning of every frame. This has the advantage that during read-in of the control data after detection of a block synchronization section some time expires before the control data to be read in becomes actually available. This makes it possible to effect the read-in of the control data under control of a microcomputer which can also be employed for other control tasks. With such a microcomputer it is customary to call a read-in control program in response to the detection of the block synchronization section. Such a call takes some time. However, this is not a drawback because the useful information becomes available only after a waiting time.

A reliable synchronization can also be obtained by means of an embodiment of the record carrier which is characterized in that the packets are arranged in frames, a plurality of consecutive frame synchronization bit groups being arranged at the beginning of each frame, which groups form a bit pattern which deviates from the bit patterns formed by the control data bit groups of the frame.

An embodiment for reading the record carrier is characterized in that the synchronization means comprise a frame synchronization detector for detecting frame synchronization bit groups situated at the beginning of each frame.

A very simple extraction of the clock signal is obtained when a record carrier is used which is characterized in that each control data bit group comprises a synchronization bit having a logic value, the logic values of consecutive control data bit groups alternating with a repetition pattern whose frequency is related to the frequency at which the packets recur.

The use of synchronization bits makes it possible to use a clock signal of a signal value corresponding to the logic value of the synchronizing bits, which results in a very simple clock signal generation.

A further embodiment of the record carrier is characterized in that to each frame bit groups for error-correction purposes are added, which bit groups are in a predetermined relation with the control data bit groups in the frame containing the control data for reproduction.

The use of such a record carrier makes it possible to detect whether the control data has been read in completely in the control unit. This is particularly advantageous when a control unit is used which comprises one microcomputer which in addition to the read in of control data serves to perform further control tasks. In that case the read-in process may be interrupted to perform another control task of higher priority. However, this means that the control data is not read in completely, but this can be detected simply on the basis of the bit groups added for error-detection purposes. After such a detection a new read-out of the incompletely read-in control data can be initiated.

BRIEF DESCRIPTION OF THE DRAWINGS

The invention will now be described in more detail, by way of example, with reference to FIGS. 1 to 31, in which FIG. 20 shows a suitable organization of the record carrier if the picture information has been recorded in accordance with a CD-I format, FIGS. 21, 23 and 24 show suitable configurations of picture lines of absolutely coded pictures for a number of different resolutions if the recorded information has been divided into blocks in accordance with a CD-I format, FIG. 22 shows a picture made up of picture lines to illustrate the configuration shown in FIG. 21.

DETAILED DESCRIPTION OF THE PREFERRED EMBODIMENTS OF THE INVENTION

Figure 1A:
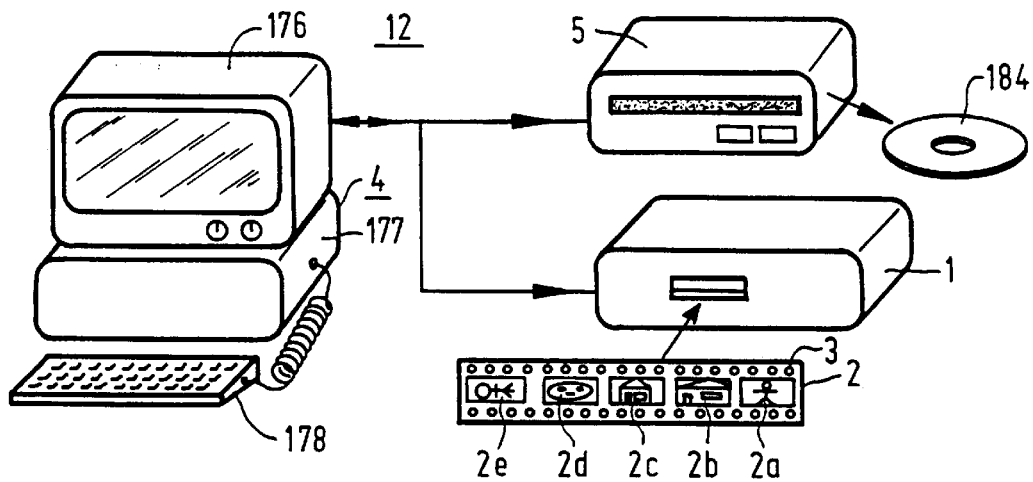
FIGS. 1*a*, 1*b* and 1*c* show a picture-storage system, a picture retrieval and reproduction system, and a simplified picture retrieval and reproduction system respectively.

FIG 1*a* shows a picture storage system 12 in which the invention can be used. The picture storage system 12 comprises a picture scanning unit 1 for scanning pictures on a picture carrier 3, for example a stripshaped photographic negative or slide. The picture scanning device 1 further comprises a picture coding unit for coding the picture information obtained upon scanning. The coded picture information is recorded on a record carrier 184 by means of a recording unit 5 under control of a control unit 4. Prior to recording the control unit 4 can apply an optional picture processing, for example to enhance, correct or edit the picture representation defined by the coded picture information. For this purpose the control unit may comprise picture processing means which are known per se. The recording unit 5 may comprise, for example, an optical, a magnetic or a magneto-optical recording device. In view of the high storage capacity of optical and magneto-optical record carriers it is preferred to use an optical or a magneto-optical recording device. The control unit 4 may comprise a computer system, for example a so-called "personal computer" or a so-called work station with suitable hardware and application software.

Figure 1B:
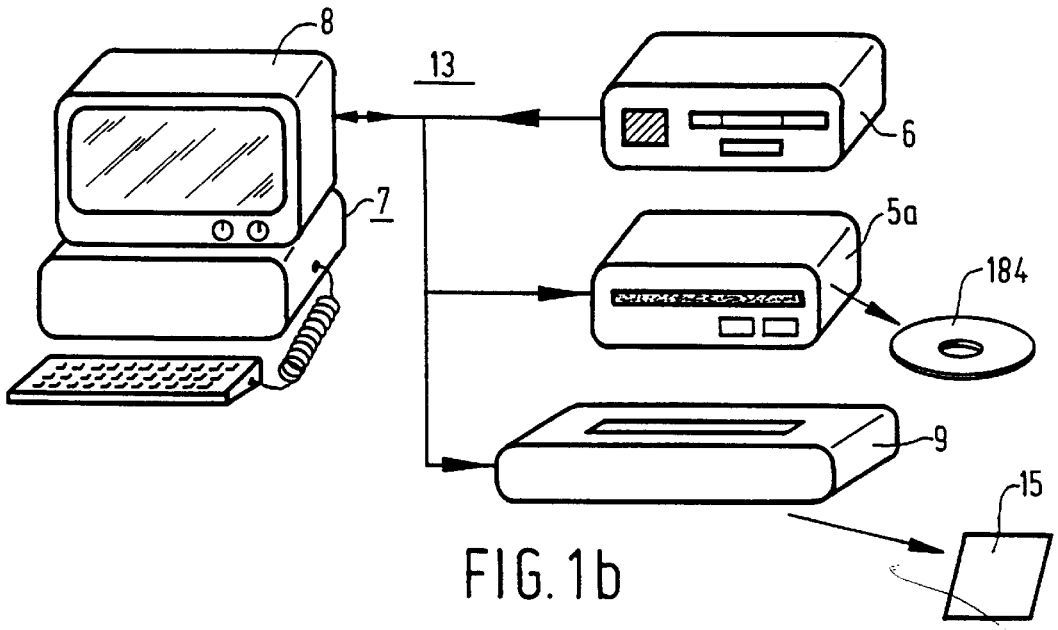

FIG 1b shows a picture retrieval and reproduction system for retrieving and displaying representations of coded pictures stored on the record carrier 184 by means of the picture storage system 12. The picture retrieval and reproduction system 13 comprises a read unit 6 for locating and reading out selected coded pictures under control of a control unit 7. Representations of coded pictures thus read can be displayed on a picture display unit. Such a picture display unit may comprise a display screen 8, which for example forms part of the control unit 7, or an electronic image printer 9 for generating a hard copy 15 of a representation of the read-out coded picture. The picture retrieval and reproduction system 13 may further comprise an additional recording device 5a, by means of which the coded picture information read by means of the read device 6, after an optional picture processing operation performed by the control unit 7 for the purpose of enhancement, correction or editing. The control unit in the picture retrieval and reproduction system 13 may comprise a computer system, for example a "Personal Computer", or a work station with suitable hardware and application software. Although such a system is very suitable for the control task to be performed and the optional picture processing it has the drawback that it is comparatively expensive.

In general, it is desirable to have such an expensive computer system for the control unit in conjunction with the electronic image printer 9 because of the complexity of the control and picture processing functions. However, if it is merely desired to display selected coded pictures on a display screen, the computing capacity and storage capacity of a computer system in the form of a personal computer or work station are high in comparison with the control functions to be performed. In that case it is preferred to employ a simplified control unit with a limited computing and storage capacity and a limited data processing speed.

Figure 1C:
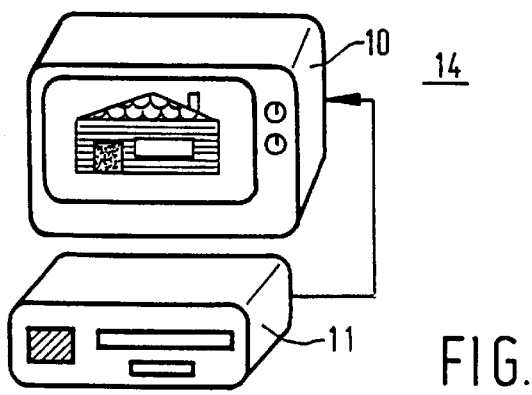

FIG 1c shows such a simplified picture retrieval and reproduction system 14. This simplified system 14 comprises a display unit 10 and a picture retrieval and read unit 11 comprising the read unit 6. A control unit for controlling the retrieval and read operation and, if applicable, a limited picture processing can be accommodated in one of the units 10 and 11, but suitably in the unit 11. When the control unit is accommodated in the retrieval and read unit 11 it is possible to employ, among others, a standard TV set or monitor unit for the picture display device.

This is an advantage, in particular for consumer uses because the consumer then merely has to purchase the retrieval and read device to display the representations of the pictures.

As a result of their comparatively high cost the picture storage system 12 shown in FIG. 1a and the picture retrieval and reproduction system 13 shown in FIG. 1b are particularly suitable for central uses, for example in photoprocessing laboratories.

Figure 2:
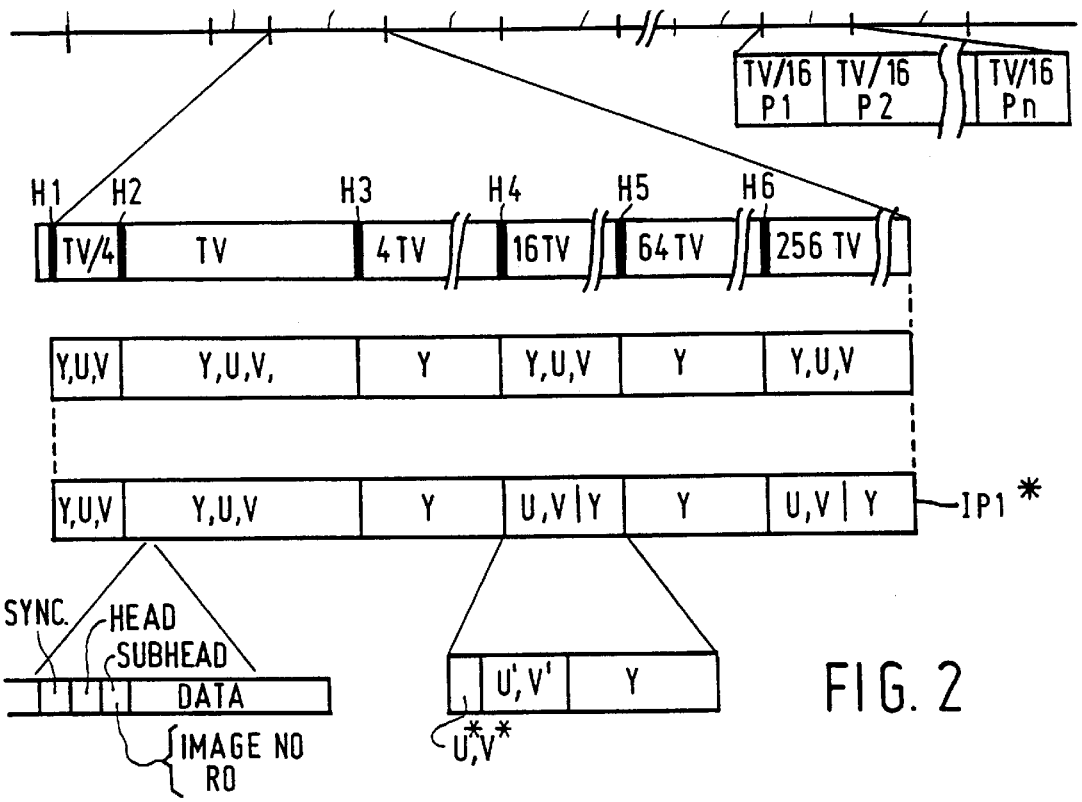
FIG. 2 shows a suitable format for recording picture information on a record carrier.

For recording coded picture information it is preferred to record the information on the record carrier in a predetermined format and order. FIG. 2 shows a suitable format and order, in which files containing coded picture information bear the references IP1, . . . , IPn. Hereinafter the files IP1, . . . ,IPn will be referred to as picture files. Moreover, a plurality of control files BB have been recorded. These files contain control data which is used for controlling the read-out of the coded picture information, for the purpose of performing optional picture processing operations on the picture information read and for the purpose of displaying representations of the coded picture information. It is to be noted that part of the control data may be included in the picture files. Preferably, this part of the control data is the part relating specifically to the control of the read-out, display and picture processing of the coded picture information contained in the relevant picture file. The advantage of this is that the required control data becomes available at the instant at which it is needed, ie. at the instant at which the picture file is read.

Apart from the picture files Ip and the associated control files BB it may be desirable in a number of cases to record files with additional information, for example audio information or text information. Such audio and/or text information may relate to, for example, coded picture information and can then be reproduced or displayed when the representations of the relevant coded picture information are displayed. The files with additional information are referenced ADD and may be recorded, for example, after the coded picture information.

For every picture stored the picture files contain a plurality of subfiles, which each define a representation of the same scanned picture, the resolutions of the representations defined by these coded pictures being different. In FIG. 2 the different subfiles for the picture file IP1 bear the references TV4, TV, 4TV, 16TV, 64TV, 256TV. The subfile TV defines a representation of the scanned picture with a resolution corresponding substantially to a standard NTSC or PAL TV picture. Such a picture may comprise, for example, 512 lines of 768 pixels each. The subfile TV/4 represents the scanned picture with a resolution which in the horizontal and the vertical direction has been reduced linearly by a factor of 2 relative to the resolution of the picture represented by the subfile TV. The subfiles 4TV, 16TV, 64TV and 256 TV define picture representations whose horizontal and vertical resolution has been increased linearly by a factor of 2, 4, 8 and 16 respectively. Preferably, the subfiles are arranged in such a way that the resolutions of the representations defined by the successive coded pictures increase (linearly) in steps of 2. During reproduction, when the consecutive subfiles are generally read successively, it is then simple to first display a representation of a picture of low resolution and, subsequently, to replace this representation wholly or partly by representations of the same picture of each time increasing resolution. This has the advantage that the waiting time before a picture representation appears on the display screen is minimized. Indeed, on account of the limited amount of information needed for this, the read-out time of a coded picture defining a low-resolution representation is short in comparison with the read-out time of encoded pictures defining higher-resolution representations.

A generally known representation of pictures is that in which the picture is composed of a matrix of small areas of constant luminance value and/or constant color value. In this representation it is customary to select the areas of constant color value to be larger than the areas of constant luminance value.

An area of constant color value will be referred to hereinafter as a color pixel and an area of constant luminance value will be referred to hereinafter as a luminance pixel. A row of color pixels of a width equal to the full picture width will be referred to hereinafter as a color picture line. A row of luminance pixels of a width equal to the full picture width will be referred to hereinafter as a luminance picture line. A picture represented by luminance picture lines and color picture lines can be defined simply by a coded picture by assigning to each luminance pixel and color pixel a digital code specifying the relevant luminance value and color values.

Figure 3:
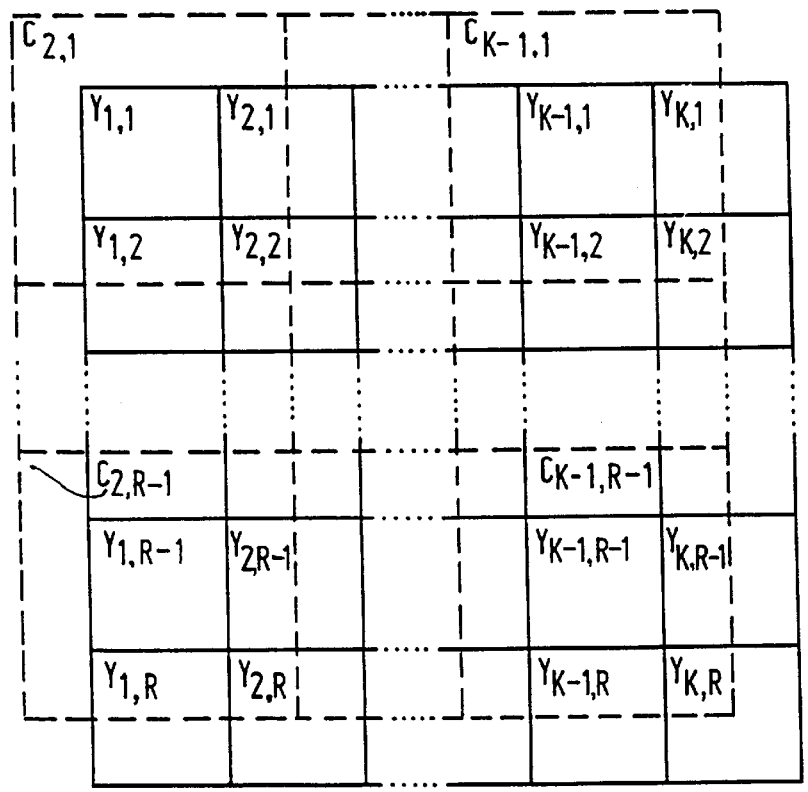
FIG. 3 illustrates a suitable coding of picture information.

FIG. 3 by way of illustration shows the structure of a picture of color pixels and luminance pixels. The luminance pixels bear the reference signs $(Y_{2,1}; \ldots; Y_{K-1,R-1})$. The color pixels bear the reference signs $(C_{1,1}; \ldots; C_{K,R})$. It is to be noted that in FIG. 3, as is customary, the dimensions of the color pixels in the horizontal and the vertical direction is twice as large as the dimensions of the luminance pixels. This means that the resolution of the color information in the horizontal and the vertical direction is a factor of two lower than the resolution of the luminance information.

A suitable picture coding is that in which a digital code or digital codes is/are assigned to every luminance pixel and every color pixel, the code(s) defining the absolute value of the luminance component Y and the absolute values of the colour-difference components U and V respectively. Such a coding will be referred to hereinafter as an absolute picture coding. Preferably, representations of a number of low-resolution pictures are recorded as absolutely coded pictures. This enables the picture information to be recovered in a simple manner. This is particularly advantageous for the simplified picture retrieval and reproduction system 14, because this enables the price of such a system, which is intended for the consumer market, to be kept low by the use of simple picture decoding systems.

The use of a picture file with a number of absolutely coded pictures of different resolutions simplifies the reproduction of representations of composite pictures, where a representation of a small low-resolution picture is displayed within the outline of a representation of a higher-resolution picture. The reproduction of such a representation of a composite picture is referred to as "Picture in Picture" (or "PIP"). Moreover, recording a plurality of absolutely coded pictures defining representations of the same picture with different resolutions simplifies the reproduction of enlarged representations of details of a coded picture. Such a function is also referred to as the TELE-function (or ZOOM-function). The availability of absolutely coded pictures with different resolutions implies that for some of the TELE functions and PIP functions the required picture information is directly available and need not be derived by means of additional picture processing operations to be performed by complex circuits.

In the recording of picture information it is customary to record the coded pixels in rows (or lines) or sometimes in columns. Recording in lines is to be preferred because in the customarily used picture display units the picture information should be presented in the form of lines.

When the absolutely coded pictures are recorded in the subfiues TV/16, TV/4 and TV it is preferred not to record consecutive coded picture lines contiguously. Such method of arranging the recorded information is frequently referred to as "interleaving". The advantage of such a method is that if a comparatively great part of the information cannot be retrieved owing to defects of the disc or other causes, it reduces the likelihood that two adjacent picture lines in the representation of the coded picture are reproduced incorrectly. Representations with faults in adjacent picture lines are comparatively difficult to restore. This is not case with representations in which erroneously read pixels (or a picture line) are situated between two correctly read picture lines. In that case the erroneously read pixels (or picture line) can be replaced simply by pixels (or a picture line) derived from one or both adjacent picture lines. It is to be noted that erroneously read pixels can also be restored readily by the use of so-called error-correction codes. The correction of errors on the basis of such error-correction codes is comparatively intricate and is therefore less suitable for use in the simplified picture retrieval and reproduction system 14, in which the use of complex circuits should be avoided whenever possible in view of the resulting high cost.

In the case that the picture information is recorded on a disc-shaped record carrier with a spiral track the part of the track needed for recording a coded picture will occupy a plurality of turns of the spiral track. In view of a simple restoration of erroneously read picture lines it is then desirable that the coded picture lines defining adjacent picture lines in the representation of the picture to be reproduced do not adjoin each other neither in the track direction (also referred to as tangential direction) nor in a direction transverse to the track (also referred to as radial direction), which will be explained with reference to FIGS. 7 and 8.

Figure 7:
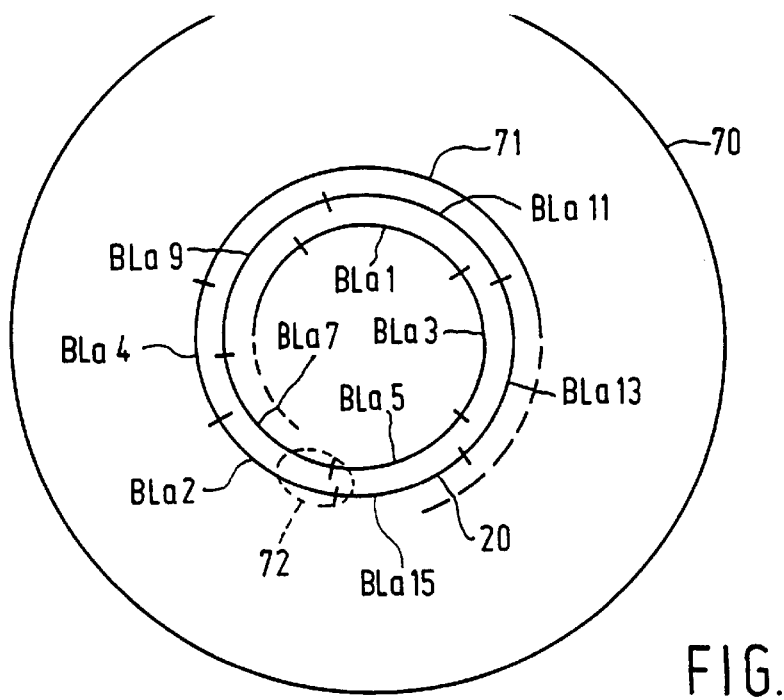
FIG. 7 shows a record carrier on which recorded coded picture lines have been arranged in a suitable manner.
Figure 8:
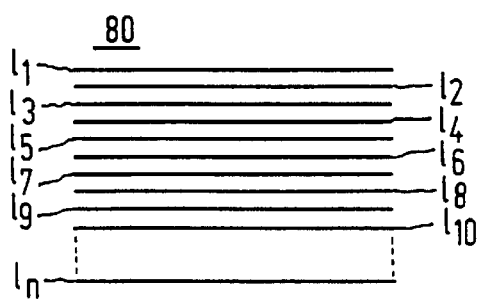
FIG. 8 shows a picture composed of picture lines.

FIG. 7 shows a disc-shaped record carrier 70 on which picture 80 composed of consecutive picture lines 11, . . . , In has been recorded in a spiral track 71 in the form of a series of absolutely coded picture lines BLa1, BLa3, BLa5, BLa7, BLa9, BLa11, BLa13, BLa2, BLa4, . . . , The absolutely coded picture lines BLa1, . . . , BLa13 represent the picture lines 11, . . . , 113 respectively. The absolutely coded picture lines have been recorded in such a way that the information of consecutive picture lines is not contiguous neither in a radial nor in a tangential direction. The reference numeral 72 refers to an unreadable disc portion, also called disc defect. The defect shown extends over more than one turn of the spiral track 71. Since the coded picture lines defining adjacent picture lines of the representation do not adjoin one another neither radially nor tangentially this prevents coded picture lines which define adjacent picture lines in the representation from being read incorrectly as result of the occurrence of disc defects. It is to be noted that for the sake of clarity the length occupied by the coded picture lines BLa on the recording is shown to be substantially greater than in reality. In practice, it occurs comparatively often that a disc defect occupies a plurality of consecutively recorded coded picture lines. In view of the requirement that adjacent picture lines should not be defined by adjacently recorded coded picture lines the order of the absolutely coded picture lines in the track depends strongly on the length of the turns of the spiral track and on the length required for recording an absolutely coded picture line. Arrangements suitable for recording absolutely coded picture lines will be described in more detail further on in the description.

For high resolutions the storage of absolutely coded picture information has the drawback that the amount of information to be recorded is very large. For such high-resolution pictures a residual coding is very suitable. In such a residual coding differences between the signal value of the pixels of the high-resolution picture and the signal value of the corresponding part of the lower-resolution picture are determined and subsequently encoded.

Figure 4:
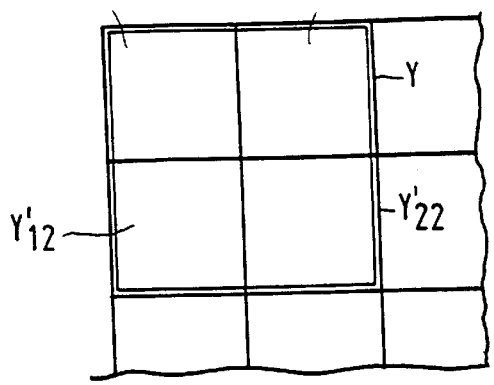
FIG. 4 illustrates a suitable residual coding to be used for in the coding of picture information.

To illustrate this coding method FIG. 4 shows one luminance pixel Y of a low-resolution picture and four luminance pixels $Y_{1,1}'; Y_{2,1}'; Y_{1,2}'$ and $Y_{2,2}'$ of the corresponding higher-resolution picture in the case that the horizontal and the vertical resolution is increased by a factor of 2. Instead of the absolute luminance value of the luminance pixels $Y_{1,1}', \ldots, Y_{2,2}'$ the residual coding encodes differences (hereinafter referred to as residual values) between the luminance values of the luminance pixels $Y_{1,1}', \ldots, Y_{2,2}'$ and the luminance pixel Y. In this way the residual values of a complete picture can be determined both for the luminance and for the color information. As the number of residual values equal to zero or being very small is large in comparison with the number of large residual values a substantial data compression can be obtained by applying an additional coding in which the residual values are non-linearly quantized and are subsequently subjected to, for example, a Huffman coding.

A residually coded picture can be used as a basis for a new residual coding for a picture with further increased resolutions. Thus, by recording one absolutely coded low-resolution picture and a series of residually coded pictures of increasing resolutions in compressed form it is possible to record a plurality of coded pictures defining representations of the same picture with increasing resolutions. In the picture file IP1 shown in FIG. 2 the pictures in the subfiles TV/4 and TV are absolutely coded and the pictures in the subfiles 4Tv, 16TV, 64TV and 256TV are residually coded, with non-linear quantization and Huffman coding. Such a coded picture will be briefly referred to hereinafter as a residually coded picture.

Figure 5:
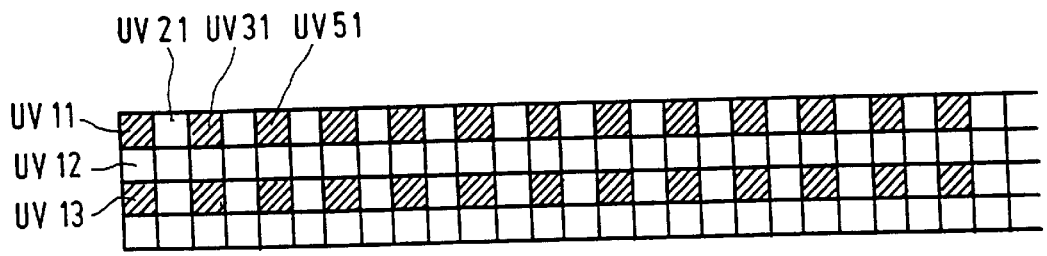
FIG. 5 illustrates a suitable arrangement of the color information of a picture for a series of coded pictures of increasing resolutions.

The color information is also coded residually in a way similar to the luminance information. However, the horizontal and the vertical resolution of the consecutive residually coded color information increases by a factor of four instead of by a factor of two as with the luminance information. This means that a picture file containing only residually coded luminance information and no color information (4TV and 64TV) alternates with a picture file containing both residually coded luminance information and residually coded color information (16TV and 256TV), see FIG. 2. Leaving out the color information in the subfiles 4TV and 64TV reduces the required storage capacity and the access time to the coded picture information in the picture file. However, the absence of the color information in the subfiles 4TV and 64TV need not adversely affect the picture quality during reproduction. This is because during the reproduction of a representation of a coded picture for which no color information has been recorded the color information of the next coded picture defining a representation of higher resolution or the color information of the preceding coded picture defining a representation of lower resolution can be utilised. In order to reduce the total access time to the required picture information it is to be preferred to record the color information U, V in the subfiles 16TV and 256TV contiguously to the luminance information Y in the subfiles 4TV and 64TV, as is illustrated for the file IP* in FIG. 2. An even shorter access time to the required high-resolution color information is obtained if the color information in the subfiles 16TV and 256TV is divided into a portion U*, V* and a portion U', V', the portion U*, V* defining color information having a horizontal and vertical resolution which is twice as low as the resolution represented by U*, V* and U', V' together. This is possible, for example, in that for a picture the coded color information of one of the four available pixels of the picture is first recorded in U*, V* and subsequently the coded color information of the other pixels of the picture is recorded, as is illustrated in FIG. 5. In this Figure the color pixels belonging to U*, V* (UV11; UV31; UV51; . . . ) are represented as shaded blocks and the color pixels belonging to U', V'(UV21; UV41, . . . , UV12; UV22; UV2) are represented as non-shaded blocks. The information U*, V* in 16Tv and 256TV defines the color information with a horizontal and vertical resolution which is half the resolution of the luminance information defined by the subfiles 4TV and 64TV respectively. Thus, the luminance information in the subfile 4TV and 64 TV respectively together with the color information U*, V* in the subfiles 16Tv and 256TV respectively again define a representation whose horizontal and vertical resolution of the color information is equal to half the resolution of the luminance information. This means that the ratio between the resolution of the color information and the luminance information of a representation defined by the combination of the luminance information of a subfile 4TV and 64TV and the color information U*V* of a subfile 16TV and 256TV respectively is equal to the ratio between the resolution of the color information and the luminance information of the representations defined by the subfiles TV/4, TV, 16TV and 256TV as a total, so that representations of all the stored coded pictures with the same resolution ratio between color and luminance information can be displayed.

However, it is to be noted that during the reproduction of the representation of the coded picture recorded by means of the subfile 4TV it is also possible to use the color information of the subfile TV or the complete color information of the subfile 16TV.

As already stated, it is customary to record the coded pixels line by line.

When the residual coding described above is used, using a non-linear quantization and Huffman coding, the residual values are represented by means of codes of varying length. This means that the space required for recording the residually coded picture lines is variable. Therefore, the position at which the beginning of the residually coded picture line is recorded is not unambiguously defined by the beginning of recording of the first coded picture line of a coded picture. This complicates the selective read-out of the coded picture lines, for example only those coded picture lines needed to carry out a TELE function. This problem can be mitigated by recording a line number LN (see FIG. 6) at the beginning of each coded picture line BL and line synchronization code LD. The line synchronization code may be, for example, a unique bit combination which does not occur within the series of Huffman codes representing information of the residually coded picture elements. It is to be noted that the addition of the line synchronization codes LD and line numbers LN has the additional advantage that it facilitates the read synchronization and significantly reduces error propagation after an erroneously read residual code.

Figure 6:
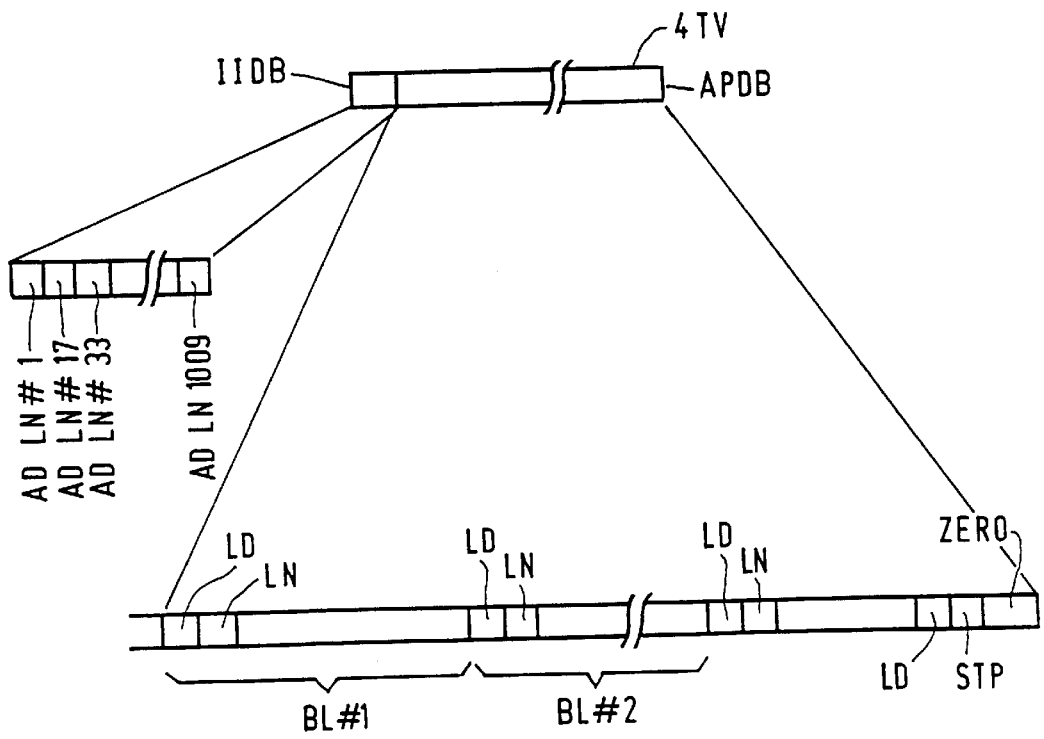
FIG. 6 shows a format of a subfile containing a residually coded picture.

A very fast retrieval of selected coded picture lines can be achieved in that the addresses at which the recordings of coded picture lines on the record carrier begin are recorded on the record carrier in a separate control file, preferably at the beginning of each subfile. In FIG. 6 these addresses have been indicated, by way of example, as ADLN#1, . . . , ADLN#1009 in the control file IIDB at the beginning of the subfile 4TV. The picture line information in the form of the series of residually coded picture lines is inserted in the section APDB of the subfile 4TV. (The section APDB represents the actual picture information within the subfile 4TV).

Generally, when searching for the starting points of the picture lines on the record carrier during a coarse search process a read element is moved relative to the record carrier to a position at a short distance before the staring point where the recording of the coded picture line begins. Subsequently, a fine search process is carried out in which, while the record carrier is scanned with a speed corresponding to the normal read speed, the beginning of the recording of the selected residually coded picture line is awaited, after which reading of the selected coded picture line is started. The accuracy with which the read element can be positioned relative to the record carrier during the coarse search process is limited and in optical data storage systems it is generally much greater than the distances between the positions at which the recordings of successive coded picture lines on the record carrier begin. Therefore, it is preferred to store only the start addresses of a limited number of coded picture lines whose starting points of recording are spaced apart by a distance substantially equal to the accuracy with which the read element can be positioned during a coarse search process. This enables the information of selected coded picture lines within a stored coded picture to be located and read rapidly without an unnecessarily large amount of space being needed for the storage of address data. In the case of a disc-shaped record carrier the average search accuracy during a coarse search process, in which the read element is radially moved over the disc, is by definition equal to half the length of one. turn of the disc, which means that the distances between the positions specified by addresses substantially correspond to half the length of one turn of the disc when disc-shaped record carriers are used.

The stored coded pictures generally define a number of pictures in landscape format (i.e. for a faithful reproduction the picture should be displayed in an orientation in which the width of the picture is larger than the height of the picture) and a number of pictures in portrait format (i.e. for a faithful reproduction the picture should be displayed in an orientation in which the height of the picture is larger than the width of the picture).

By way of illustration FIG. 1 shows an image carrier with some pictures in landscape format (2a, 2b, 2c and 2d) and one picture in portrait format (2e). On the record carrier all the coded pictures are recorded as though they were representations of pictures in landscape format. This is in order to enable a uniform picture scanning to be used without the necessity to detect whether the scanned picture is of the landscape or portrait type and to change over the scanning and/or picture processing depending upon the detection result. However, this means that during reproduction the representations of portrait size pictures will be displayed in an incorrect rotated position. This can be precluded by providing a possibility to assign a rotation code to the recorded coded pictures, which code indicates whether the representation should be rotated during reproduction and, if this is the case, whether the representation should be rotated through an angle of 90, 180 or 270 degrees. This rotation code can be included in every picture file IP1, . . . , Ipn. It is also possible to record these rotation codes in the control file BB or to store these rotation codes in a non-volatile memory arranged in the read unit or connected to this unit.

During reproduction it is then possible to determine on the basis of the rotation code whether the representation to be displayed should be rotated and, if this is the case, a rotation through the desired angle can be performed prior to reproduction. A drawback of including the rotation codes in the picture files IP is that these rotation codes have to be determined already during scanning of the pictures. In practice this means that an operator of the picture storage system should determine for each scanned picture whether the stored picture is to be rotated during reproduction, because the known auxiliary devices are not always capable of detecting whether a scanned picture is of landscape or portrait size and whether the picture is presented to the scanning unit with the correct orientation. This is undesirable in particular because it implies that an operator must be present during recording, which makes it difficult to realise a fully automated picture storage system 12.

Figure 9:
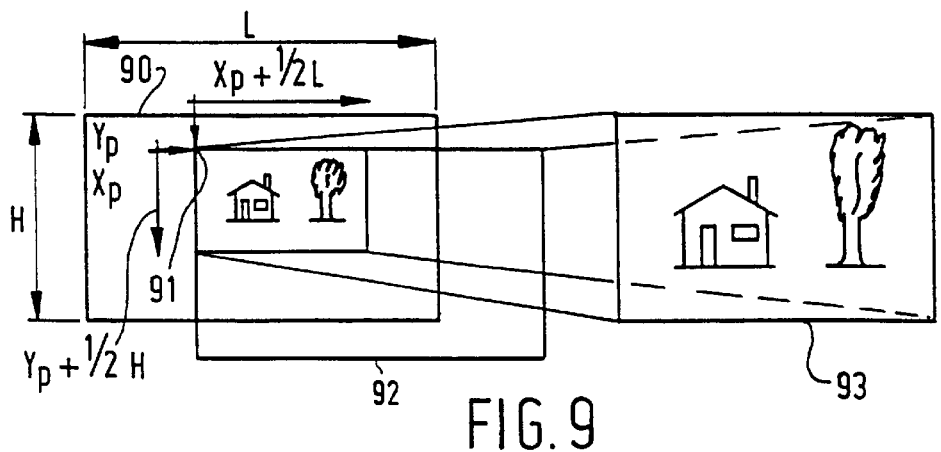
FIG. 9 illustrates a number of different picture processing functions.

If the rotation codes are already available during recording of the coded picture information it will be advantageous to record these codes on the record carrier. In the case of the file organisation shown in FIG. 2 a suitable position for recording the rotation codes is the subfile FPS of the control file BB. For reasons of user convenience it is desirable to specify, apart from the required rotation, whether instead of a representation of stored coded pictures a representation which is slightly shifted (to the left, right, top or bottom) should be displayed. This is certainly desirable if the display area within which the representation is to be displayed in a display unit is smaller than the dimensions of the representations, because it is possible that an important detail of the picture falls outside the display area. The desired shift can be specified by assigning a translation code to every coded picture. In FIG. 9 a suitable translation coding for a picture 90 is defined by means of the coordinates xp and yp of a vertex 91 of the picture 91 to be displayed after translation. By means of a translation code and a magnification code it is possible to specify the magnification factor with which a certain part of the original picture is to be displayed. The reference numeral 93 indicates an enlarged representation of a part of the picture 90, defined by a translation xp, yp and a magnification factor of 2. In addition to the above data it is also possible to include other picture display data in the subfile FPS of the control file BB, such as for example parameters specifying a color or luminance adaptation to be applied before a representation of the coded picture is displayed. Moreover, it is advantageous to store the desired sequence in which the pictures must be reproduced in the subfile FPS within the control file BB.

Figure 10:
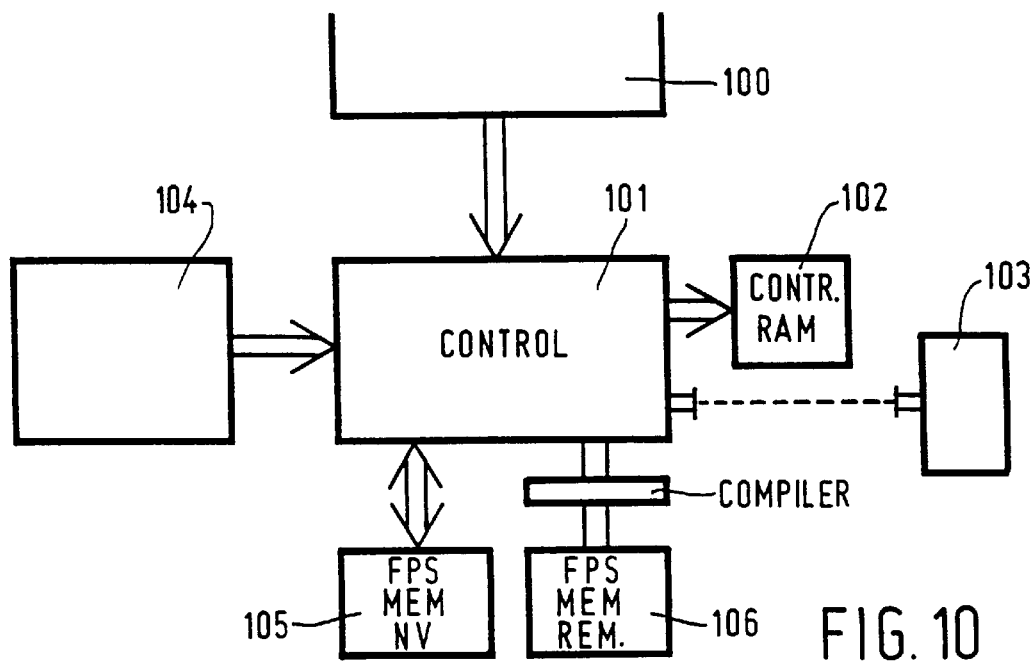
FIG. 10 shows an embodiment of a retrieval and reproduction system capable of displaying picture information in accordance with preferential reproduction settings.

The afore-mentioned information about the display sequence, rotation, translation, magnification, brightness and color adaptations and other picture processing operations to be performed prior to reproduction of the representation of the coded picture will be referred to hereinafter as preferential reproduction settings. A collection of preferential reproduction settings defining the preferred sequence as well as all the desired picture processing operations for all the coded pictures on a record carrier will be referred to hereinafter as a set of preferential reproduction settings. It may be advantageous to record more than one set of preferential reproduction settings in the file FPS. This enables a different display sequence and other picture processing operations to be selected by different persons, for example persons within a family. It also allows a user to make a choice from different sets of preferential reproduction settings. It is to be noted that when a record carrier of the write-once type is used the sets of preferential reproduction settings can be recorded on the record carrier only if they are available during recording. This requires human intervention during recording. During reading of the record carrier a set of preferential reproduction settings is selected and the representations of the coded pictures can be displayed in conformity with the selected set of preferential reproduction settings. FIG. 10 is a block diagram of an embodiment of a picture retrieval and display system by means of which representations of coded pictures can be displayed in conformity with a selected set of preferential reproduction settings. In this diagram the reference numeral 100 refers to a read unit for reading the record carrier. For the purpose of applying the information being read the read unit 100 is coupled to a control and signal processing unit 101. From the information received from the read device 100 the unit 101 selects the file FPS containing the set(s) of preferential reproduction setting(s) and stores this (these) set(s) in a control memory 102. By means of a data entry unit 103, for example a remote control device, a user can select a set from the control memory 102 and can subsequently activate the unit 101 to start the read cycle, in which the coded picture information is read in the sequence specified by the selected set of preferential reproduction settings under control of the unit 101. After the coded picture information has been read out this information is processed in accordance with the selected set of preferential reproduction settings and is applied to a display unit 104.

It may occur that after some time the preferential reproduction settings stored on the record carrier are no longer entirely in compliance with the user's wishes or that no or wrong preferential reproduction settings have been recorded on the record carrier. This is problematic in particular if the record carrier is of a type which cannot be overwritten, because the recorded preferential reproduction settings then cannot be adapted. This problem can be mitigated by providing the retrieval and display system in FIG. 10 with a non-volatile memory 105 in which together with a record carrier identification code a new set of preferential reproduction settings or information about the desired changes of the preferential reproduction settings relative to the set of preferential reproduction settings recorded on the record carrier is stored for the record carrier specified by means of the record carrier identification code. In view of the limited storage capacity of the non-volatile memory 105 it is desirable to record the information necessary for the preferential reproduction settings in a most compact form, for which reason it is preferred to record the information about the changes of the preferential reproduction settings.

Figure 11:
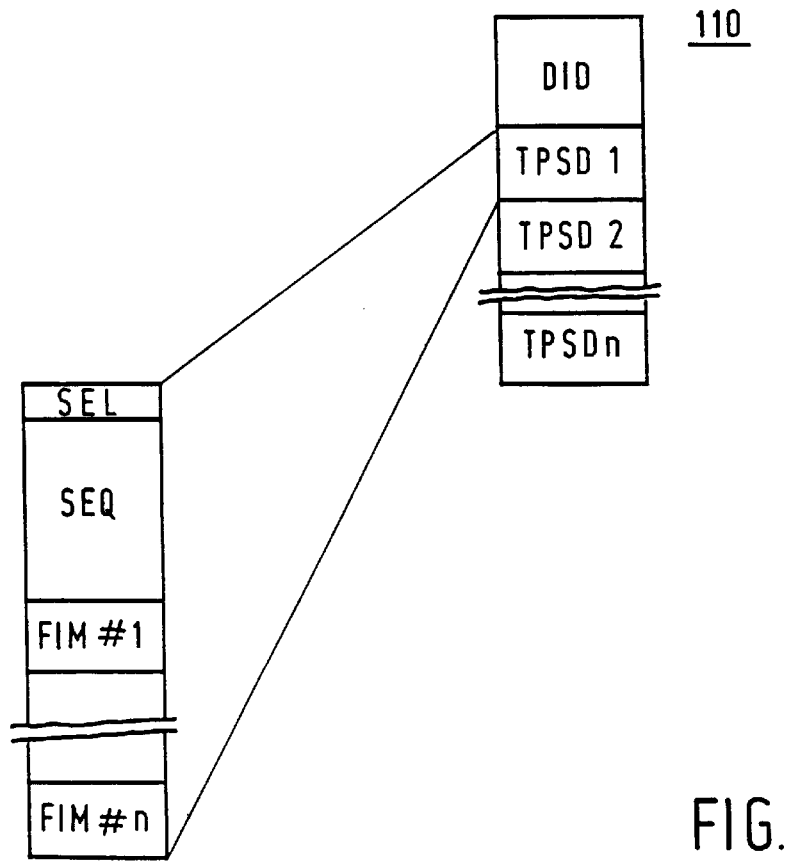
FIG. 11 shows a suitable format for recording preferential reproduction settings on the record carrier.

FIG. 11 shows by way of example a suitable format 110 of the preferential reproduction settings included in the file FPS on the record carrier. The format 110 comprises a section DID in which the unique record carrier identification code is stored. Such a code may comprise a large random number generated by means of a randomnumber generator and recorded on the record carrier. The code may comprise a time code indicating the time in years, months, days, hours, minutes, seconds and fractions of seconds. Alternatively, the record carrier identification code may comprise a combination of a time code and a random number. In the format 110 the section DId is followed by sections FPS1, FPS2, . . . , FPSn in which a number of different sets of preferential reproduction settings are stored. Each of the preferential reproduction setting sections FPS1, . . . , FPSn contains a portion SEL in which a set identification number for each of the different sets of preferential reproduction settings to be selected by different users are specified, and a portion specifying the sequence SEQ in which the representations of the stored pictures are to be reproduced. This portion is followed by the coded sections FIM#1, . . . , FIM#n storing for the pictures 1, . . . , n preferential processing operations to be performed before the representation of the relevant picture are displayed.

Figure 12:
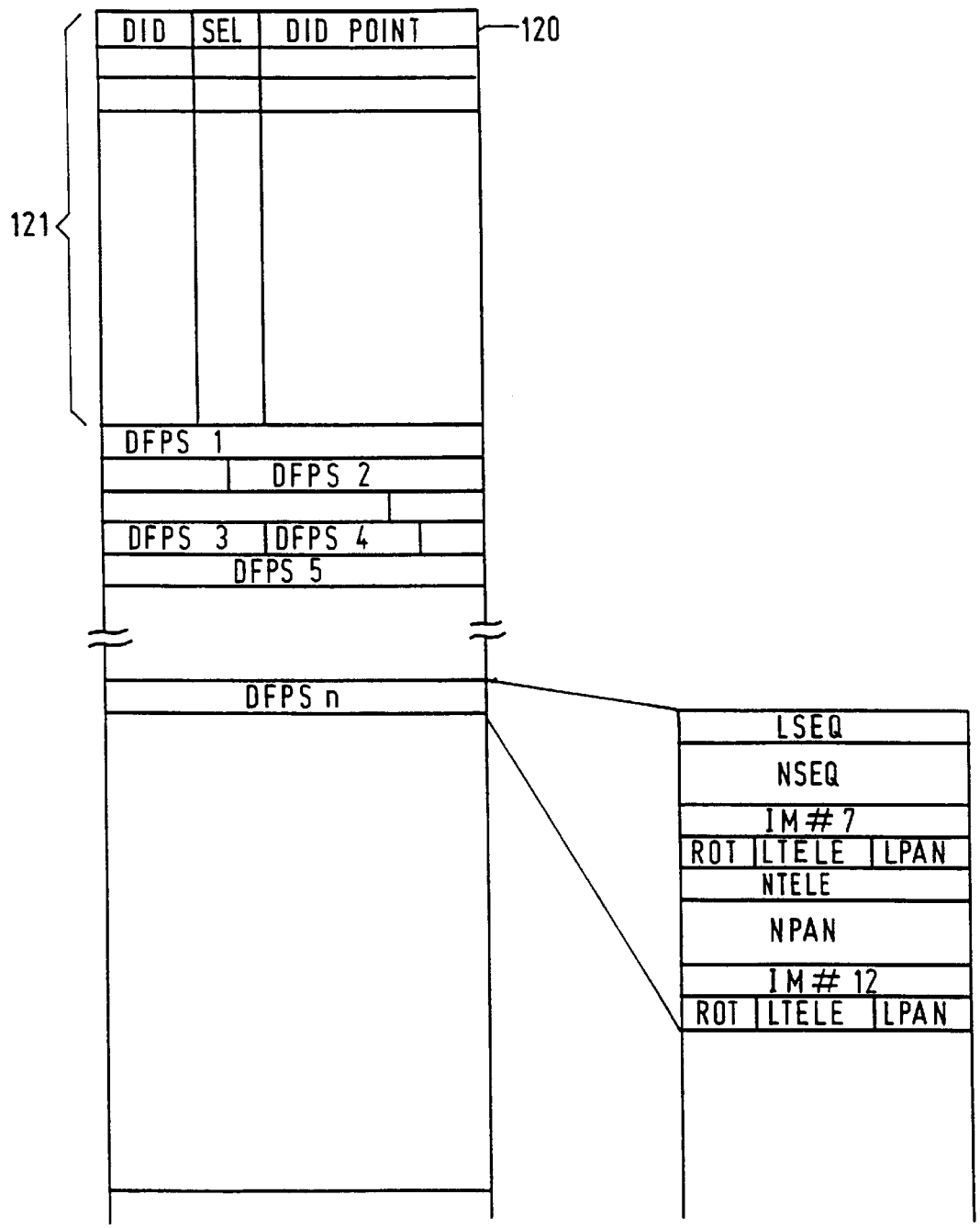
FIG. 12 shows a suitable format for storing preferential reproduction settings in a non-volatile memory.

FIG. 12 shows by way of example a suitable format 120 in which the information about the desired adaptations of the set of preferential reproduction settings can be stored in the non-volatile memory 105. The format 120 comprises a section 121 specifying combinations of record carrier identifications and set identification numbers for which information about preferential reproduction settings has been stored. To each of these combinations a pointer is assigned, which pointer is included in the section DID-POINT and specifies the address of the sections DFPS1, ., DFPSn in the non-volatile memory 105.

Every section DFPS comprises a portion LSEQ with a code indicating the space (for example in numbers of bytes) required to specify the new sequence. If the portion LSEQ indicates a length not equal to zero LSEQ will be followed by a portion NSEQ with the data specifying the new display sequence. After NSEQ the new preferential processing operations are specified for every picture with modified preferential processing operations. ROT indicates the section with the rotation code. The sections LTELE and LPAN specify the length available for the storage of the new data relating to picture magnification (in a section NTELE) and picture translation (in a section NPAN). In this way it is possible to select the accuracy with which the picture processing information is to be stored. Thus, it is possible, for example, to define three different lengths indicating three different accuracies. LTELE and LPAN are followed by the portions NTELE and NPAN. If the information about the picture magnification and picture translation need not be changed this is indicated by the length zero in LTELE and LPAN. By storing only the preferential processing operations for pictures with modified preferential processing operations the space required for the storage of the new preferential reproduction setting is reduced considerably. Apart from the reduction of the required storage space by said recording of the differences it is possible to obtain an additional reduction by specifying the length required for the storage of modified data. When the record carrier is read an adapted set of preferential reproduction settings is derived from the preferential reproduction settings recorded on the record carrier and the differences stored in the memory 105, and this adapted set is stored in the memory 102.

Instead of, or in addition to, the non-volatile memory 105 a changeable memory 106, for example in the form of a magnetic card, EPROM, EEPROM or NVRAM, can be employed for the storage of preferential reproduction settings in the retrieval and display system shown in FIG. 10.

This has the advantage that a user can display the picture information on a record carrier in accordance with the same preferential reproduction setting on different picture retrieval and display systems to which a changeable memory 106 can be connected. When one of the two or both memories 105 and 106 are used for the storage of preferential reproduction settings it is desirable that a selection is made from the different sets of preferential reproduction settings defined by the sets of preferential reproduction settings on the record carrier and by the modifications of the preferential reproduction settings stored in the memories 105 and 106. For this purpose the unit 101 should comprise selection means. These selection means may be of a type which are operated by the user to make a choice from the various sets of preferential reproduction settings defined for one specific record carrier and selection number by the preferential reproduction setting information stored on the record carrier and in the memories 105 and 106. However, alternatively these selection means may be of a type which, prior to reproduction on the basis of the contents of the memories 105 and 106 and the sets of preferential reproduction settings recorded on the record carrier, determine the sets of preferential reproduction settings available for the relevant record carriers and store them, for example, in the memory 102. Subsequently, one of the available sets of preferential reproduction settings in the memory 102 is selected in accordance with a predetermined selection criterion. Preferably, the selection criterion is such that the highest priority is assigned to the preferential reproduction setting information in the changeable memory 106, medium priority to the preferential reproduction setting information in the non-volatile memory, and the lowest priority to the preferential reproduction settings on the record carrier. If the unit 101 comprises a computer, automatic selection can be realised by loading the computer with a suitable selection program.

Now reference is made again to the file OV in FIG. 2, which for all the picture files IP1, . . . , IPn comprises a subfile TV/16 containing an absolutely coded low-resolution picture. Recording a file OV has the advantage that an overview of the coded picture information recorded on the record carrier can be obtained with a minimal access time. This is possible, for example, by successively by displaying the coded pictures in the subfile TV/16 as representations which wholly or partly fill the display screen, preferably in the sequence defined by the selected set of preferential reproduction settings. However, it is also possible to compose a representation in the form of a so-called mosaic picture from the subfiles, in which mosaic picture a large number of representations of the coded low-resolution pictures contained in the subfiles TV/16 are arranged in the form of a matrix, preferably in an order dictated by the selected set of preferential reproduction settings. By way of illustration FIG. 13 shows a mosaic picture 130 made up of the representations (IM#1, IM#3, . . . , IM#26) of sixteen low-resolution subfile pictures.

Figures 13, 14:
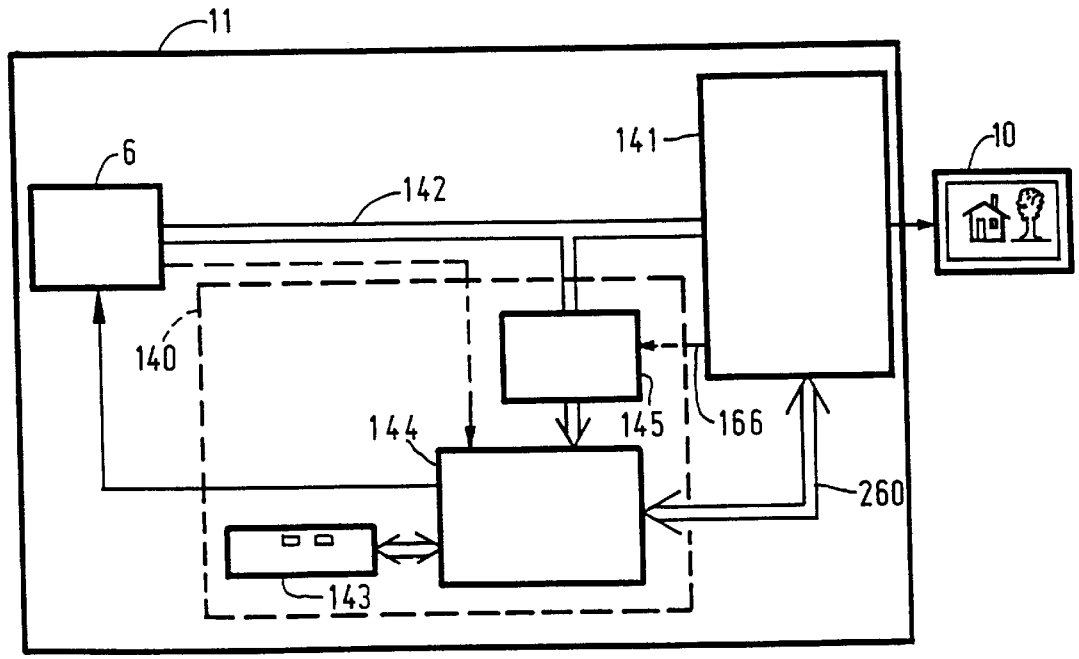
FIG. 13 shows a mosaic picture composed of sixteen low-resolution images.
FIG. 14 shows in greater detail an embodiment of the simplified picture retrieval and reproduction system.

FIG. 14 shows an embodiment of the picture retrieval and display system of FIG. 1c in more detail. In the present system the picture retrieval and read unit 11 comprises the read unit 6, a control unit 140 and a picture processing unit 141. The read unit 6 supplies the information read from the record carrier to the control unit 140 and to the picture processing unit 141 via a signal path 142. The control unit 140 then selects specific information contained in the control files BB and IIDB from the information read. The picture processing unit 141 selects picture information from the information read and converts this picture information into a form suitable for the display unit 10. The read unit 6 and the picture processing unit 141 are controlled by the control unit 140 on the basis of the data entered by a user, for example via a data entry unit 143, and on the basis of the control data in the control files BB and IIDB.

Figure 15:
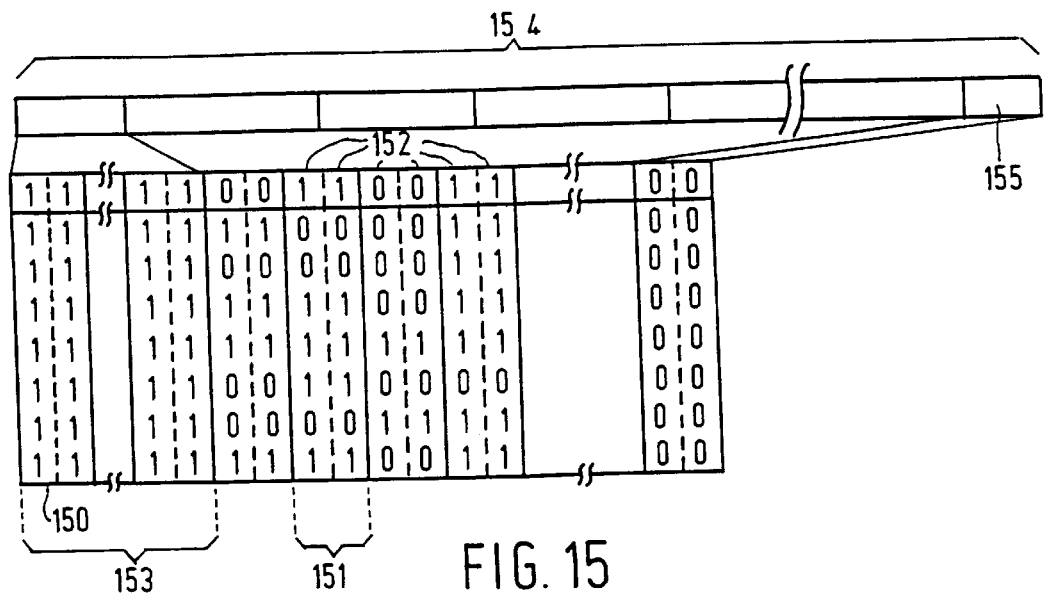
FIG. 15 shows an embodiment in which control data groups can be arranged in packets.

In view of the large amount of information for every recorded picture it is preferred to read files containing picture information with a high speed, i.e. with a high bit rate, in order to minimize the read time per picture read. However, this means that the data in the control file is also read with a high bit rate. The control task is performed by the control unit 140. This control task requires only a limited data processing rate, enabling a simple slow low-cost microcomputer having a low data processing rate to be used for this purpose. However, in general such a low-cost microcomputer is not capable of processing the control data which is supplied at a high rate during read-out of the control files BB and IIDB. This is because the rate at which the control data is presented (which rate is substantially equal to the picture information rate) is too high to enable it to be processed by the slow low-cost computer. This problem can be mitigated in that every bit group containing control data is recorded n times (n being an integer greater than or equal to 2) in succession on the record carrier. A group of n times repeatedly recorded bit groups will be referred to hereinafter as a packet. Packets of n identical bit groups are then supplied when the control data is read. FIG. 15 by way of example illustrates the manner in which the control data in the control files BB and IIDB can be supplied by the read unit 6 in the case that n is equal to 2 and the number of bits per bit group is 8.

In FIG. 15 the bit groups bear the reference numeral 150 and the packets bear the reference numeral 151. The number of bits per bit group is eight and the number of bit groups per packet is two.

By repeating identical bit groups n times it is achieved that the rate at which the control data is supplied by the read unit is reduced by a factor of n without the use of additional auxiliary functions. By a suitable choice of the value of n it is thus possible to reduce the rate at which the control data is applied to the slow microcomputer system of the control unit 141 to such an extent that it can be handled by the slow microcomputer system 144. Between the signal path 142 and the microcomputer system 144 a data extraction circuit 145 can be arranged to supply each of the packets 151 of control data to the microcomputer system 144 as one bit group at a rate equal to the bit group repetition rate divided by n.

Figure 16A:
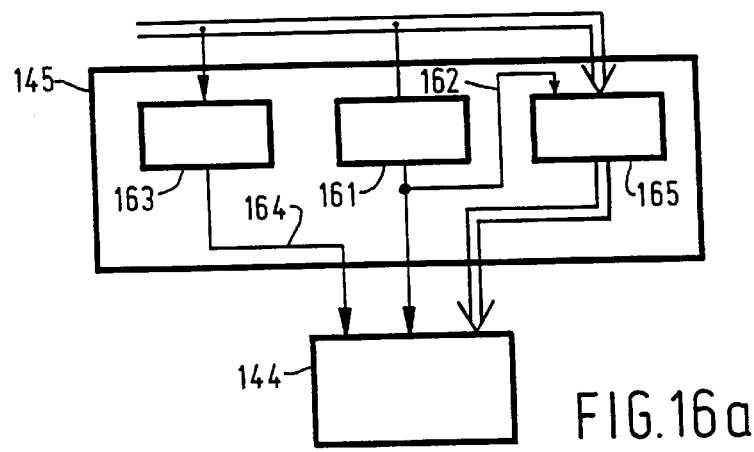
FIGS. 16*a*–16*b* show a data extraction circuit for use in the picture retrieval and reproduction system shown in FIG. 14.

Such a data extraction circuit 145 may comprise, for example, a register 160 (see FIG. 16a) which is loaded with a clock frequency equal to the bit group repetition rate divided by n. This clock signal can be obtained very simply by using one bit within each bit group 150 as a synchronization bit 152. To the synchronization bits 152 of successive bit groups 150 a logic value may be assigned which alternates with a frequency related to the repetition rate of the packets 151 of bit groups 150. The alternation frequency may be equal to half the repetition rate of the packets (as shown in FIG. 15) or a multiple thereof. This has the advantage that a clock signal can be used which is derived directly from the synchronization bits.

The data extraction circuit 145 comprises a clock extraction circuit 161 which supplies an alternating clock signal corresponding to the alternating logic values of the synchronization bits to a load control input of the register 160. The register 160 is of a customary type which is loaded with a bit group of each packet 151 under control of the clock signal. The clock extraction circuit 161 also transfers the clock signal to the microcomputer system 144 via the signal line 162. Preferably, the bit groups in the control file are arranged in so called frames, which bear the reference numeral 154 in FIG. 15. In that case it is desirable that the beginning of each frame 154 can be detected simply. A very simple detection can be achieved by inserting at the beginning of the frames 154 a plurality of frame synchronization groups 153 with synchronization bits 152 which exhibit a predetermined pattern of logic values 150 which differs distinctly from the possible patterns of logic values of the synchronization bits 152 which can occur in the other packets.

Each frame 154 has a portion 155 containing redundant information for the purpose of detecting whether the frame has been read-in correctly by the microcomputer 144. An incorrect read-in may be caused, for example, by a program interrupt, in which the process of reading in the control data is interrupted in order to carry out another control program. Such a control program can be called, for example as a result of the input of data in the data entry unit 143, in order to fetch the entered data from the data entry unit 143. Since an incorrect read-in of data from the control files BB and IIDB is generally caused by a program interrupt this requires that the error correction performed on the basis of the portion 155 is carried out by the microcomputer 144 itself. The data extraction circuit 145 comprises a frame synchronization detector 163 which detects the beginning of each frame on the basis of the synchronization bits 152 in the frame synchronization bit groups 153. After detection of the beginning of the frame the frame synchronization detector 163 supplies a synchronization signal to the microcomputer 144 via a signal line 164. Under control of the signals received via the signal lines 164 and 165 the microcomputer 144 reads in the control data available in the register 160 in an, in principle, customary manner. It is to be noted that, in principle, the functions of the frame synchronization detector 163 and/or the register 160 and/or the clock extraction circuit 161 can also be performed by the microcomputer 144 itself.

In the above described process of reading in the control data from the control files BB and IIDB the clock signal for the register 160 is derived from the synchronization bits 152. However, it is also possible to derive the clock signal for loading the register 160 from a picture information clock signal which is usually generated in the picture processing unit 141 for the purpose of reading in the coded picture information. This picture information clock signal has a fixed relationship with the bit group repetition rate in the read-out picture files and, consequently, with the bit group repetition rate in the control files BB and IIDB. This is because the control files and picture files have been formatted and coded in the same way. Therefore, the clock signal for loading the register 160 can be derived simply from the picture information clock signal by means of a frequency dividing circuit.

Figure 16B:
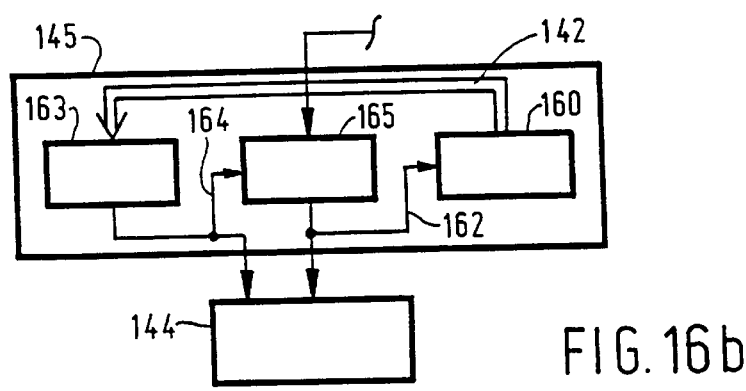

FIG. 16b shows an example of the data extraction circuit 145, which employs a frequency divider 165 for deriving the clock signal for the register 160, which divider derives the clock signal from the picture information clock signal, which is applied to the frequency divider 165 by the signal processing unit 141 via a signal line 166. The clock signal for loading the register 160 must be synchronized with the beginning of the frames 154. This can be realized simply by employing a resettable counting circuit for the frequency divider 165, which counting circuit is reset each time by a reset signal generated upon detection of the beginning of the frames. The reset signal can be the signal supplied by the frame synchronization detector 163 via the signal line 164 in response to every detection of the frame synchronization bit groups 153.

In the case that the information in the control files is arranged in blocks, for example in a manner which is customary with CD-ROM and CD-ROM XA and which will be described hereinafter with reference to FIG. 19, the reset signal for the counter can be derived on the basis of the block synchronization sections (SYNC) situated at the beginning of each block (BLCK). However, this requires that the beginning of each frame 154 is always situated at a fixed position relative to the block synchronization section (SYNC). This can be achieved simply by selecting the beginning of each frame 154 at the beginning of a block. In the last described method of synchronizing the clock signal for the register 160 no use is made of the frame synchronization bit groups 153 situated at the beginning of each frame 154. However, in that case it is also desirable that the beginning of each frame 154 comprises a number of bit groups not containing any control data. Indeed, upon detection of the beginning of each frame the microcomputer calls a read-in program for controlling the read-in of the applied control data. However, at this instant the microcomputer may be busy performing another control task. Such a control task must be interrupted before the read-in program can be called. This interruption of an active control task and the subsequent call for the read-in program requires some time. Arranging a number of bit groups without any control data at the beginning of each frame 154 ensures with a high reliability that during read-out of the first packet 151 of useful control data in each frame 154 the microcomputer 144 is ready to read in the control data under control of the read-in program. From the above it is evident that the synchronization bit groups 153 at the beginning of every frame may serve a dual purpose, i.e. providing synchronization and realign a waiting time until the first useful control data is presented.

In the case that the bit groups 153 are used only for realizing the waiting time the logic values of the bits in these bit groups 153 may assume an arbitrary value.

If the bit groups 153 are also used for synchronization purposes it is important that the bit groups 153 exhibit a bit pattern which does not occur in the other bit groups of the frame 154. For this purpose numerous different methods are possible, such as for example the use of non-identical bit groups in a packet or the insertion of additional packets without useful control information between the packets of control data. The lastmentioned method may be, for example, to insert packets comprising only bits of the logic value "0" after every ten packets. When a group of, for example, thirty-two frame synchronization bit groups 153 comprising only bits of the logic value "1" is used, this will guarantee that the pattern formed by the frame synchronization bit groups 153 does not occur in the other packets of the frame 154.

Figure 17:
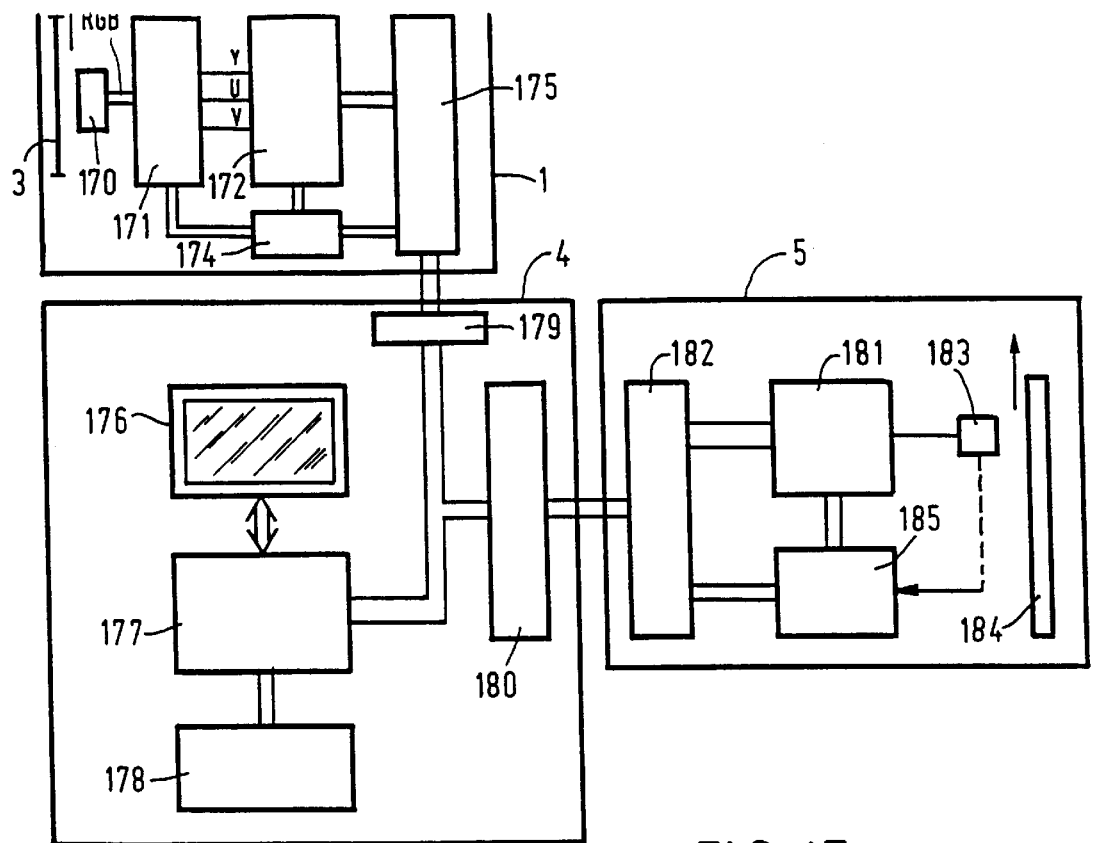
FIG. 17 shows in greater detail an embodiment of the picture storage system.

FIG. 17 shows an embodiment of the picture storage system 12 in greater detail. The scanning unit 1 in FIG. 17 comprises a scanning element 170 for scanning the image carrier 3 and for converting the scanned picture information into customary information signals, for example RGB picture signals, representing the scanned picture. The picture signals at the output of the scanning element define the highest attainable resolution in number of pixels per picture. The information signals supplied by the scanning element 170 are converted into a luminance signal Y and two color-difference signals U and V by means of a customary matrix circuit 171. A coding circuit 172 converts the signals Y, U and V in a customary manner into absolutely coded signals (for the lower-resolution pictures) and residually coded pictures (for the higher-resolution pictures) in accordance with the coding schemes described hereinbefore. The scanning element 170, the matrix circuit 171 and the coding circuit 172 are controlled by means of a customary control circuit 174 on the basis of control commands applied to the control circuit 174 by the control unit 4 via an interface circuit 175. The absolutely and residually coded picture information generated by the coding circuit 172 is applied to the control unit 4 via the interface circuit 175. The control unit 4 may comprise a computer system comprising a display unit 176, a computing and storage unit 177 and a data entry unit 178, for example a keyboard, for data input by the user. In a customary manner the display unit 176 and the data entry unit 178 are coupled to the computing and storage unit 177. The computing and storage unit 177 is further coupled to the picture scanning unit 1 and the recording unit 5 via an interface circuit 179 and 180 respectively. The recording unit 5 comprises a formatting and coding unit 181 which converts the information to be recorded, which information is received from the control unit via an interface circuit 182, into codes which are suitable for recording and which are arranged in a format suitable for recording. The data which has thus been coded and formatted is applied to a write head 183, which records a corresponding information pattern on the record carrier 184. The recording process is controlled by a control circuit 185 on the basis of the control commands received from the control unit 4 and, if applicable, address information indicating the position of the write head 183 relative to the record carrier 184.

The storage and control unit 177 is loaded with suitable software to arrange the residually coded picture information supplied by the scanning unit 1 in a customary manner in accordance with the afore-mentioned formatting rules and to compose the picture files IP and OV. Moreover, the computing and storage unit 177 has been loaded with software for inserting in the control file, in a customary manner and in accordance with the afore-mentioned formatting rules, the preferential reproduction settings input by an operator together with other automatically generated control data, such as for example a list of addresses at which the various files have been recorded on the record carrier 184.

The computing and storage unit 177 may further have picture processing software enabling the scanned picture information to be processed, for example for the purpose of error correction, such as for example out-of-focus correction and grain removal, or for the purpose of color adaptation or brightness adaptation of the picture.

The files composed by means of the computing and storage unit 177 are applied to the recording unit 5 in the desired sequence in order to be recorded.

Very suitable combinations of a record carrier 184 and a recording unit 5 have been described in detail inter alia in European Patent Applications no. 88203019.0(PHQ 88.001), 90201309.3 (PHQ 89.016), 8900092.8 (PHN 12.398), 8802233.8 (PHN 12.299), 8901206.3 (PHN 12.571), 90201094.1 (PHN 12.925), 90201582.5 (PHN 12.994), 90200687.3 (PHN 13.148), 90201579.1 (PHN 13.243), and Dutch Patent Applications no. 8902358 (PHN 13.088) and 9000327 (PHN 13.242). The record carrier described therein is eminently suited for recording information in accordance with a CD format. A recording device for recording the files on such record carrier is shown diagrammatically in FIG. 18. The shown recording device comprises a formatting circuit 186, which composes the information to be recorded, which has been applied via the interface circuit 182, in accordance with a formatting scheme, for example as customary in the so-called CD-ROM or CD-ROM XA system.

By way of illustration this format is shown broadly in FIG. 19. In accordance with this format the data is arranged in blocks BLCK of a length corresponding to the length of a subcode frame in the CD signal. Each block BLCK comprises a block synchronizing section SYNC, a header section HEAD containing an address in the form of an absolute time code corresponding to the absolute time code in the subcode portion recorded with the block, and if the CD-ROM XA format is used the block BLCK further comprises a subheader section SUBHEAD containing inter alia a file number and a channel number. In addition, each block BLCK comprises a DATA section containing the information to be recorded. Each block BLCK may also comprise a section EDC&ECC containing redundant information for the purpose of error detection and error corrections. The recording unit 5 shown in FIG. 18 further comprises a CIRC coding circuit 187 for interleaving the information and for adding parity codes for the purpose of error detection and error correction (hereinafter also referred to as error correction codes). The CIRC encoding circuit 187 performs the above-mentioned operations upon the formatted information supplied by the formatting circuit 186. After these operations have been performed the information is applied to an EFM modulator 188, in which the information is given a form which lends itself better for recording on the record carrier. Moreover, the EFM modulator 188 adds subcode information, which includes inter alia an absolute time code as address information in the so-called subcode Q channel.

FIG. 20 shows an organization of the record carrier in the case that the information has been recorded in the track 20 in accordance with the CD format described above. Parts corresponding to the organization shown in FIG. 2 bear the same reference numerals.

The recorded information is preceded by a lead-in section LI (also referred to lead-in track), as customary in the recording of CD signals, and is terminated with a customary lead-out section LO (also referred to as lead-out track).

When the information is recorded in CD format it is preferred to include in the control file BB a section recorded in accordance with the CD-I standard. These sections are the "Disk Label & Directory", referenced DL, and the so-called application programs, referenced AF. This enables the recorded picture information to be displayed by means of a standard CD-I system. Preferably, a subfile FPS with the sets of preferential reproduction settings is also included in the application program section AF. In addition to the sections DL and AT the control file BB comprises a subfile IT comprising a section CNTR with control data and a section FPS with the sets of preferential reproduction settings in the format already described with reference to FIG. 15. Preferably, the section IT is recorded in a predetermined area on the record carrier in a section of predetermined length. This is in order to simplify retrieval of the required information by the microcomputer. If the section IT is not large enough to accommodate all the control data a part of the control data can be recorded in a section ITC after the file OV. In that case it is preferred to include a pointer in the section IT to specify the starting address of ITC.

For the case that the information has been recorded in CD format FIG. 21 shows for the absolutely coded subfile TV such an arrangement of the picture lines Y01, Y02, . . . , Y16 with absolutely coded luminance information and the picture lines C01, C03, . . . , C15 with absolutely coded color information, that successive lines do not adjoin each other in the track direction (also referred to as tangential direction) and in a direction transverse to the track (also referred to as radial direction).

Figures 22, 23:
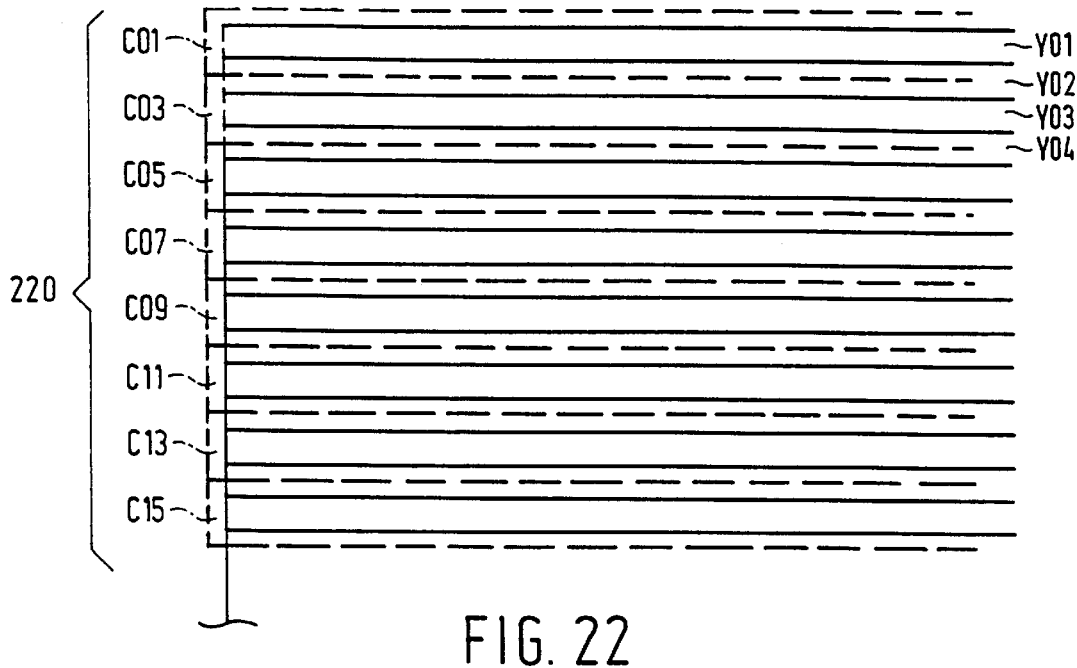

FIG. 22 shows the positions of the picture lines for the associated picture representation. As is shown in FIGS. 21 and 22, a number of odd coded luminance picture lines (Y01, Y03, . . . , Y15) with coded luminance information are recorded in a section comprising the blocks BLCK#1,#2 and#3, subsequently a number of even coded color picture lines (C01, C05, . . . , C13) with coded color information are recorded in a section comprising the blocks BLCK#4 and#5, then the even coded luminance picture lines (Y02, . . . , Y16) with coded luminance information are recorded in a section comprising the blocks BLCK#5, . . . ,#8, and finally the coded even color picture lines (C03, C07, C15) with coded color information are recorded in a section comprising the blocks BLCK #8 and#9. The coded picture lines in the blocks BLCK#L, . . . , BLCK#9 define a contiguous part of the picture representation shown in FIG. 22. A group of sections defining a contiguous part of the representation will be referred to hereinafter as a section group. In a manner similar to that described above, section groups define other contiguous parts of the representation in the subfile TV. The coded picture lines with picture information for the subfiles TV/4 and TV/16 can be arranged in a similar way, as is shown in FIGS. 23 and 24.

Figure 25:
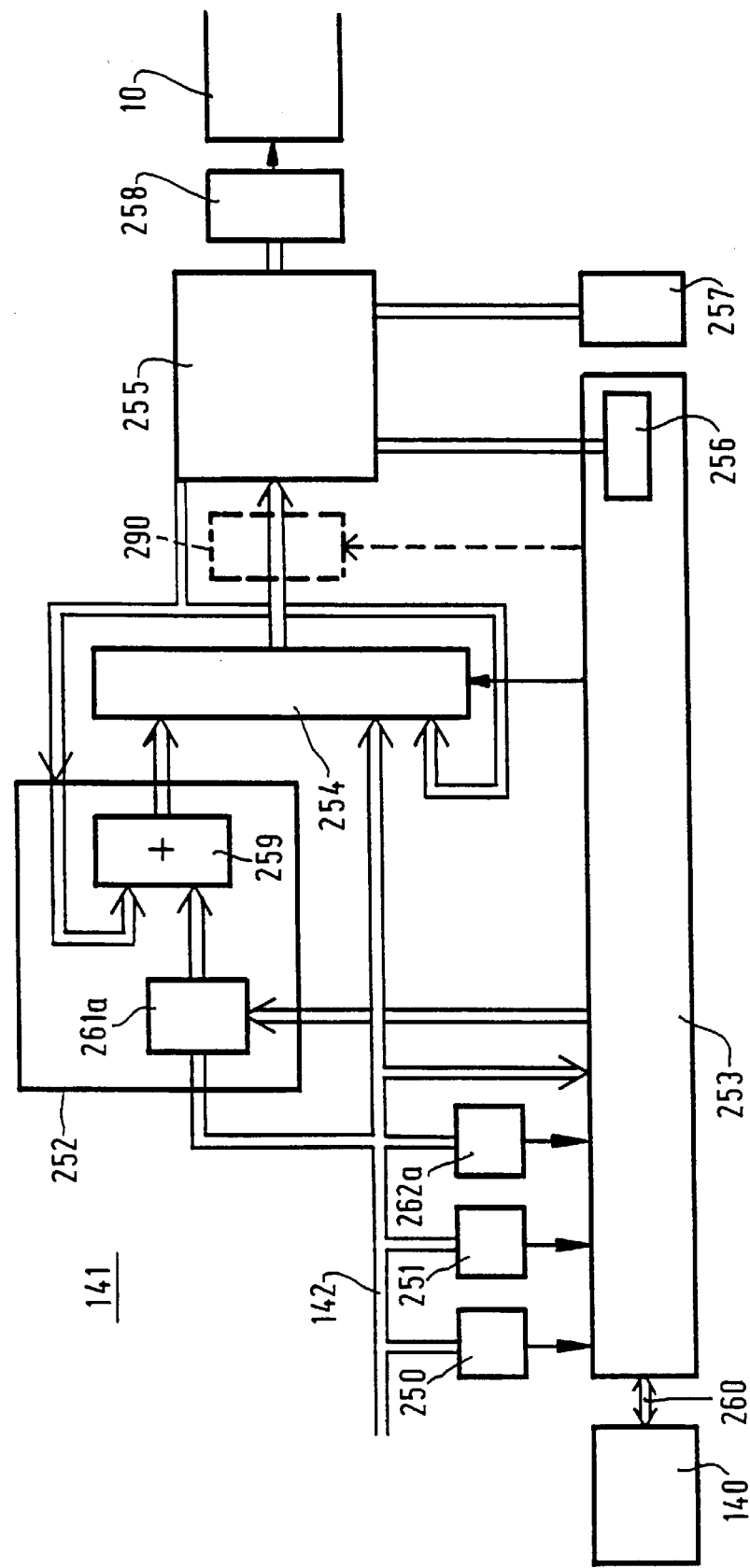
FIG. 25 shows an example of a picture processing unit.

This arrangement prevents two or more adjacent picture lines in the representation of the read coded picture from being read incorrectly as a result of disc defects. The restoration of representations of pictures in which incorrectly read picture lines adjoin each other is very difficult to realize. This is in contradistinction to the restoration of an incorrectly read picture line situated between two properly read picture lines in the representation. In the last-mentioned case restoration is simple by replacing incorrectly read picture lines by pixels derived from adjacent picture lines. FIG. 25 shows the picture processing unit 141 in greater detail. The picture processing unit 141 comprises a first detection circuit 250 for detecting the synchronization codes LD and the picture line numbers LN indicating the beginning of each residually coded picture line. A second detection circuit 251 serves for detecting the beginning of each subfile in each picture file with a residually coded picture to indicate the beginning of the section IIDB containing the addresses of a number of coded picture lines. It is to be noted that the detection circuits 250 and 251 are needed only for processing the residually coded pictures and not for processing absolutely coded pictures. For the purpose of these detections inputs of the first and the second detection circuit 250 and 251 are connected to the signal path 142. A decoding circuit 252 for decoding the residually coded picture information and a control circuit 253 for controlling the picture processing operation are connected to the signal path 142. The signal path 142 and outputs of the decoding circuit 252 are connected to data inputs of a picture memory 255 via a multiplex circuit 254, to store the read and decoded picture information. Data outputs of the picture memory 255 are connected to the inputs of the decoding circuit 252 and to the inputs of the multiplex circuit 254. The control circuit 253 comprises an address generator 256 for addressing the memory locations in the picture memory 255. The picture processing unit 141 further comprises a second address generator 257 for addressing the memory locations in order to output the content of the picture memory to a signal converter 258. The signal converter 258 is of a customary type which converts the picture information read from the picture memory 255 into a form suitable for application to the picture display unit 10. The decoding circuit 252 may comprise, for example, a Huffman decoding circuit 261a controlled by the control unit 253 and an adder circuit 259. The Huffman decoding circuit 261a decodes the information received via the signal path 142 and subsequently supplies this decoded information to one of the inputs of the adder circuit 259. Another input of the adder circuit 259 is connected to the data outputs of the picture memory 255. The result of the adding operation performed by the adder circuit 259 is applied to the multiplex circuit 254. The control circuit 253 is coupled to the control unit 140 via a control signal path 260. The control circuit 253 may comprise, for example, a programmable control and computing unit. Such a control and computing unit may comprise, for example, a dedicated hardware unit or a microprocessor system loaded with suitable control software, by means of which on the basis of control commands received via the control signal path 260 the address generator 256 and the multiplex circuit 254 are controlled in such a way that a selected portion of the picture information applied via the signal path 142 is loaded into the picture memory. The information thus stored in the picture memory 255 is read with the aid of an address generator 257 and is subsequently applied to the display unit 10 via the signal converter 258 in order to be displayed.

Figure 26:
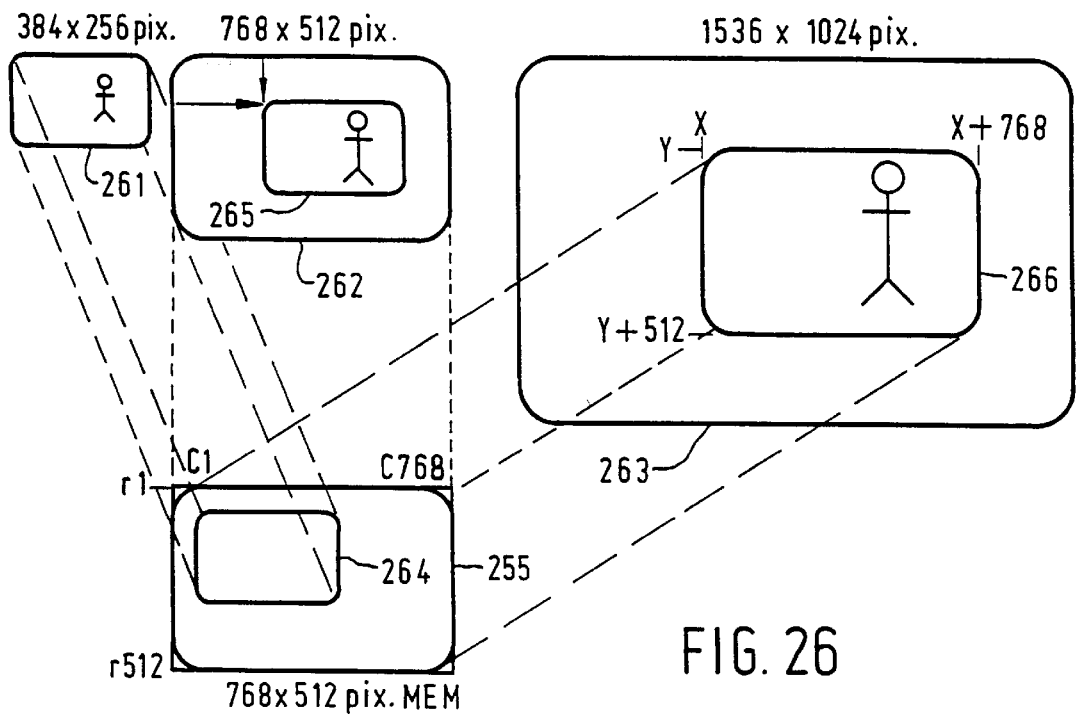
FIGS. 26 and 27*a*–27*d* illustrate picture processing functions to be performed by the picture processing unit.

In FIG. 26 the reference numerals 261, 262, 263 denote picture representations of the same picture but with different resolutions. The representation 261 comprises 256 picture lines of 384 pixels each. The representation 262 comprises 512 picture lines of 768 pixels each and the representation 263 comprises 1024 picture lines of 1536 pixels each. The coded pictures corresponding to the representations 261, 262 and 263 are included in consecutive subfiles TV4, TV and 4TV of a picture file IP. The capacity of the picture memory 255 shown in FIG. 26 is 512 rows of 768 memory locations (also called memory elements). If a representation should represent the entire coded picture that subfile is selected from the picture file IP, whose number of pixels corresponds to the capacity of the picture memory, which in the present case is the subfile defirnig the representation 262. This selection can be made on the basis of the setting data, such as picture numbers and resolution order (this is the identification of the subfile resolution), which are stored at the beginning of each subfile in, for example, the header HEAD and the subheader SUBHEAD of the blocks BLCK. For each subfile this data is read in by the control circuit 253 in response to a signal supplied by a block synchronization detector 262a upon detection of the beginning of each block BLCK.

In the case that a representation of an absolutely coded picture is to be reproduced, upon detection of the beginning of the subfile to be selected, the control circuit sets the multiplex circuit 254 to a state in which the signal path 142 is connected to the data inputs of the picture memory 255. Moreover, the address generator 256 is set to a state in which the memory locations are addressed in synchronism with the reception of the successive pixel information, in such a way that the information for the picture lines 11, . . . , 1512 is stored in the respective rows r1, . . . , r512 of the memory 255. The picture information thus loaded into the memory 255 is read out and is converted into a form suitable for the display unit 10 by means of the signal converter 258. The read-out sequence is determined by the sequence in which the address generator 257 generates the successive addresses. During normal reproduction this sequence is such that the memory is read in a row-by-row fashion, starting with the row r1 and starting with column c1 within a row. This is possible both in accordance with the interlaced-scan principle and the progressive-scan principle. In the case of read-out according to the interlaced-scan principle all the odd rows of the picture memory 255 are read first and subsequently all the even rows of the picture memory 255 are read. In the case of read-out in accordance with the progressive-scan principle all the rows are read in sequence. A very attractive alternative for the method of storing the picture information in the picture memory 255 is that in which the picture memory 255 is first filled with picture information from a picture file defining a lower-resolution representation of a picture and subsequently the content of the memory is overwritten with a coded picture defining a higher-resolution representation of the same picture. In the above example this is possible in that during read-out of each coded pixel from the subfile TV/4 each of a group of 2×2 memory elements is each time filled with the signal value defined by this coded pixel. This method is known as the "spatial replica" method. A better picture quality is obtained by filling only one of the memory elements of the 2×2 matrix with the signal value defined by a read-out pixel, and by deriving the other pixels of the 2×2 matrix from adjacent pixels by means of known interpolation techniques. This method is known as the "spatial interpolation" method. After detection of the next subfile (in the present case TV) the content of the picture memory is each time overwritten with the picture information of this subfile in the methods described above. The amount of information in the subfile TV/4 is only a quarter of that in the subfile TV. This results in a substantial reduction of the time after which a first provisional picture is displayed on the display unit. After read-out of the picture file TV/4 this low-resolution picture is overwritten with a representation of the same picture having the desired resolution. As the picture files with coded pictures of successive resolutions succeed one another directly no time is lost in searching for the subfile TV after read-out of the subfile TV/4.

Figure 27A:
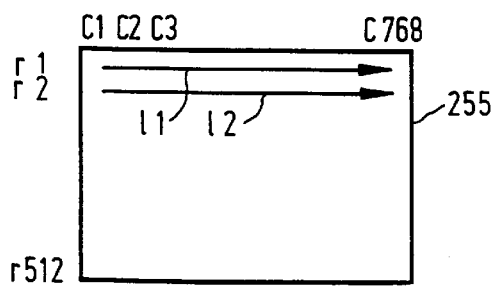
Figure 27B:
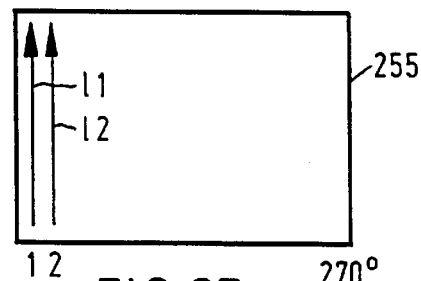
Figure 27C:
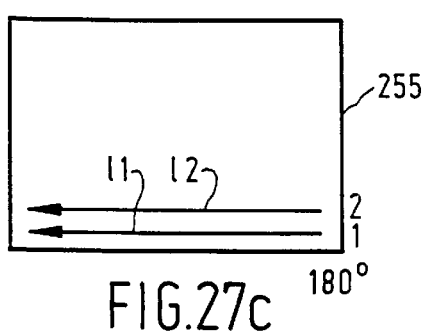
Figure 27D:
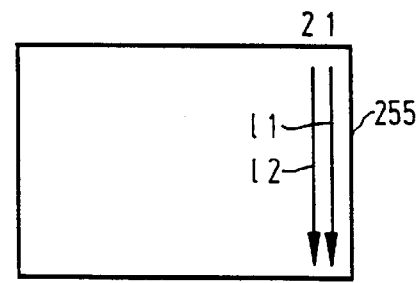

In the case that a picture is to be rotated the address generator 256 is set to a state in which the sequence of addressing the memory locations is adapted in accordance with the desired rotation angle. FIGS. 27b, 27c and 27d illustrate how the picture information is stored in the memory for a rotation through an angle of 270, 180 and 90 degrees respectively. For the sake of clarity these FIGS. only show the positions of the information of the first two picture lines 11 and 12 of the picture.

In the case that a representation of a small picture is to be displayed within the outline of a full-scan representation of another picture or, if desired, the same picture (PIP function), this can be achieved simply by filling the desired location of the picture memory 255 with the low-resolution picture of the subfile TV/4 without magnification. When the picture memory 255 is filled the address generator 256 is then set to a state in which the information for memory locations is addressed in which the small picture is to be stored. To illustrate this these memory locations are represented as a frame 264 in FIG. 26. During the picture processing described above the presence of the low-resolution picture in the subfile TV/4 again has the advantage that the picture information required to perform this function is directly available in the picture file IP, so that additional processing is not necessary.

When an enlarged representation of a part of the absolutely coded picture is to be displayed the information of a part of the picture, for example the part corresponding to a frame 265, is selected. The information of each pixel of the selected part is loaded into every memory location of a group of 2×2 memory locations, so that a magnified fullscan representation of low resolution is displayed on the display unit. Instead of repeating each pixel 2×2 times in the memory the memory may be filled in accordance with the spatial-interpolation principle mentioned in the foregoing.

In order to magnify the residually coded pictures the above step is performed first. Subsequently, the part represented by the frame 266 is selected in the subfile 4TV. The part in the frame 266 corresponds to the part within the frame 265 in the representation 262. The control circuit 253 sets the multiplex circuit 254 to a state in which the output of the residual decoding circuit 252 is connected to the data inputs of the memory 255. The address generator 256 is set to a state in which it addresses the picture memory 255 in synchronism with the received coded pixels in the sequence in which the residually coded picture information from the subfile 4TV becomes available. The picture information in the addressed memory locations is applied to the decoding circuit 252 and by means of the adder circuit 259 it is added to the residual value, after which the information thus adapted is loaded into the addressed memory location. The part of the picture information recorded on the record carrier corresponding to the frame 266 is preferably read on the basis of the information in the control file IIDB. The information in the section IIDB is read in by the control circuit 253 in response to a signal from the detector 250. Subsequently, the address of that coded picture line is selected from this information which is situated shortly before the first coded picture line corresponding to the picture line in the frame 266. After this, the control circuit supplies a command to the control unit 140 via the control signal path 260, which control unit in response to this command initiates a search process in which the part with the selected coded picture line is located. When this part is found the read-out of the picture information is started and the adaptation of the content of the memory 255 is started as soon as the part of the first coded picture line which corresponds to the part of the picture within the frame 266 is reached. The detection of this coded picture line is effected on the basis of the line numbers which together with the line synchronization codes LD have been inserted at the beginning of each coded picture line. The control circuit reads in these line numbers LN in response to a signal from the detector circuit 251. The storage of the address information at the beginning of the subfile 4TV enables a rapid access to the desired information to be obtained. The detection of the read-out of the desired residually coded picture lines is simplified by the presence of the line synchronization codes and line numbers in the subfile 4TV.

Figure 18:
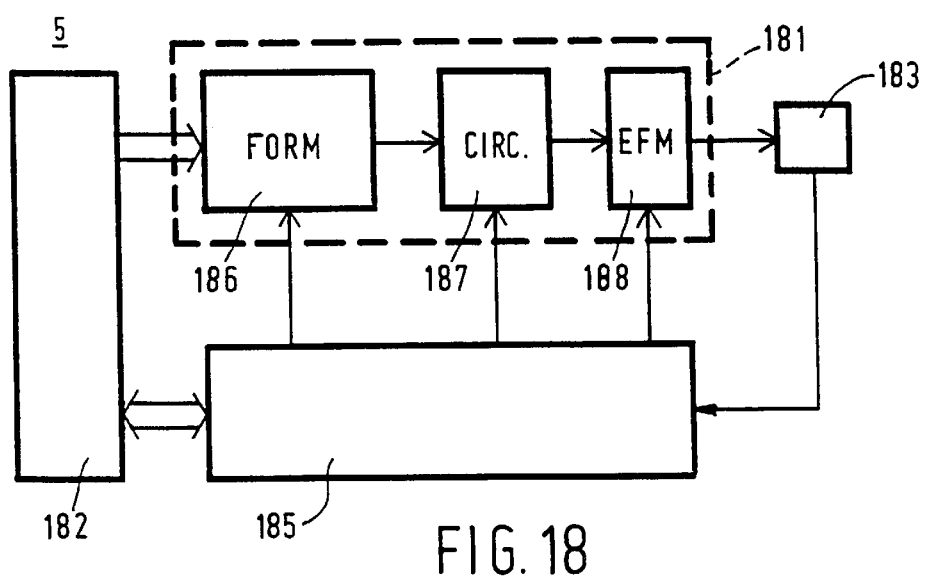
FIG. 18 shows a recording unit for use in the picture storage system, FIG. 19 diagrammatically illustrates the CD-ROM XA format.
Figure 28:
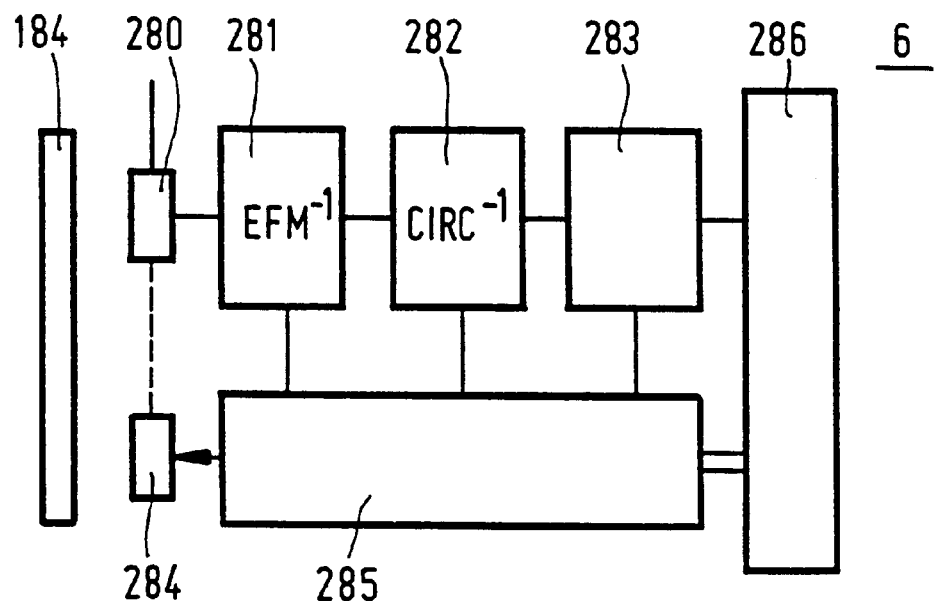
FIG. 28 shows an embodiment of a read device, FIGS. 29 and 31 diagrammatically show examples of a simplified picture processing unit.
Figure 29:
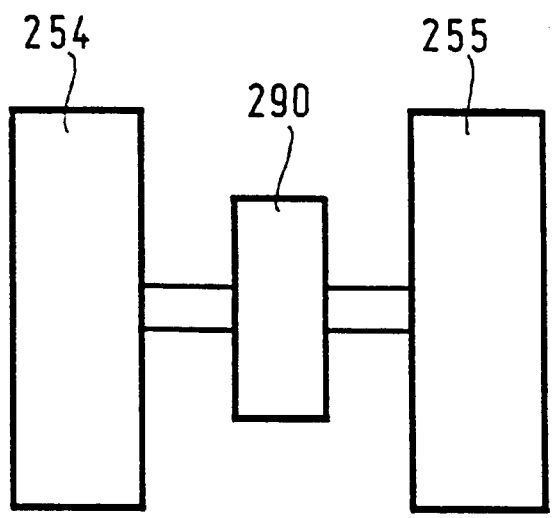

FIG. 28 shows an embodiment of the read unit 6 by means of which it is possible to read out the coded picture information recorded on the record carrier by means of the recording unit shown in FIG. 18. The shown read unit 6 comprises a customary read head 280 which reads the information patterns on the record carrier 184 by scanning the track 20 and converts the resulting information into corresponding signals. The read unit further comprises a customary positioning unit 284 for moving the read head 280 in a direction transverse to the tracks to a portion of the track 20 specified by a selected address. The movement of the read head 283 is controlled by a control unit 285. The signals converted by the read head 280 are decoded by an EFM decoding circuit 281 and are subsequently applied to a CIRC decoding circuit 282. The CIRC decoding circuit 282 is of a customary type, which restores the original structure of the information which has been interleaved prior to recording and which detects and, if possible, corrects incorrectly read codes. Upon detection of incorrigible errors the CIRC decoding unit supplies a new error flag signal. The information which has been restored and corrected by the CIRC decoding circuit 282 is applied to a deformatting circuit 283 which removes the additional information added by the formatting circuit 186 prior to recording. The EFM demodulating circuit 281, the CIRC decoding circuit 282, and the deformatting circuit 283 are controlled in a customary manner by the control unit 285. The information supplied by the deformatting circuit 283 is applied via an interface circuit 286. The deformatting circuit may comprise an error correction circuit by means of which errors which cannot be corrected by the CIRC decoding circuit can be detected and corrected. This is effected by means of redundant information EDC & ECC added by the formatting circuit 166. The error correction circuit, which is comparatively complex and therefore comparatively expensive, is not necessary. This is because the effects of erroneously read codes in the absolutely coded picture information can be masked simply by replacing the incorrectly read coded pixels and/or a complete coded picture line by picture information derived from one or more adjacent coded pixels or adjacent coded picture lines. Such a correction can be effected simply by means of the signal processing unit 141 shown in FIG. 25, by programming the control circuit 253 so as to be responsive to the error flag signal supplied by the CIRC decoding circuit 282 to control the address generator 256 in such a way that the information of an adjacent pixel is read and, at the same time, the multiplex circuit 254 is set to a state in which the data outputs of the picture memory 255 are connected to the data inputs. Subsequently, the address generator is reset to its previous state and instead of the incorrectly read coded pixel the information read from the picture memory 255 is stored at the addressed memory location.

In the case that a residually coded picture is read the value in the memory 255 is not adapted upon detection of an incorrectly read residual value but remains unchanged. This can be achieved, for example, by causing the control circuit to generate a signal which inhibits writing into the memory 255 when the erroneous residual value is applied.

The capacity of the picture memory 255 is large, so that the cost price of such a memory is comparatively high. The memory capacity may be reduced by arranging between the multiplexer 254 and the picture memory 255 a sample rate converter 290 of a customary type, which reducers the number of pixels per line from 786 to 512.

Figure 31:
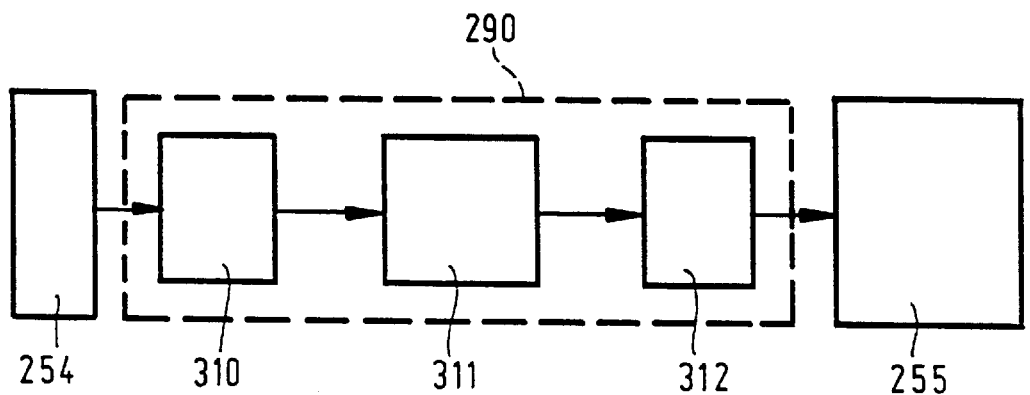

FIG. 31 shows an example of the sample rate converter 290. The present example comprises a series arrangement of an upsampling and interpolation circuit 310 and a low-pass filter 311, and a downsampling and decimating circuit 312.

The use of the sample rate converter 290 enables a memory of 512 by 512 memory locations to be employed. Since for practical reasons the number of rows and the number of columns of memory locations in a memory are preferably powers of two, this yields a memory of particularly satisfactory dimensions. Moreover, as a result of the reduction of the number of memory locations to 512 per row the required memory readout frequency is reduced, so that less stringent requirements have to be imposed on the read-out speed of the memories used.

The usually employed picture tubes have a maximum resolution corresponding to approximately 5 MHz, which corresponds to approximately 500 pixels per line, so that the reduction of the number of memory locations per row has no visible effects on the reproduced picture.

The use of the sample rate converter is also advantageous when portrait-size representations of pictures are to be displayed on a display screen, which will be explained hereinafter with reference to FIGS. 30a, 30b, 30c and 30d.

Figure 30A:
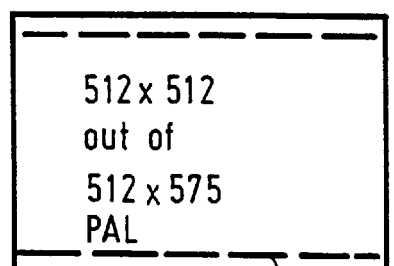
FIGS. 30*a*–30*d* illustrate the operation of the simplified picture processing unit shown in FIGS. 29 and 31.

In FIG. 30a the reference numeral 300 refers to the dimensions of a picture in accordance with the PAL TV standard. Such a picture in accordance with the PAL TV standard comprises 575 useful picture lines. During reproduction of the information in the picture memory of 512×512 memory elements 512 of these 575 useful picture lines are utilized. This means that a representation 301 of the coded picture in the picture memory fits completely within aspect ratio of the frame 300 as defined by the PAL TV standard, only a small part of the available display screen area being left unused.

Figure 30B:
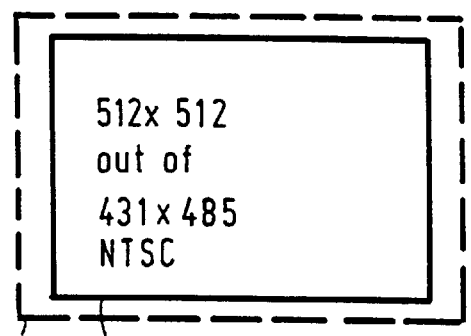

In FIG. 30b the reference numeral 320 denotes a frame having the dimensions of a picture in accordance with the NTSC TV standard. Such a picture in conformity with the NTSC TV standard comprises 431 useful lines. This means that only a limited part of a representation 303 of the coded picture present in the picture memory 255 falls outside the outline of a picture in accordance with the NTSC standard.

FIGS. 30a and 30b concern landscape-size reproductions of representations of coded pictures. However, if portrait-size representations of coded pictures are required the problem arises that the height of the picture corresponds to 768 pixels, the number of useful picture lines being 575 in accordance with the PAL TV standard and 485 in accordance with the NTSC TV standard. When a picture memory of 512 rows of memory locations is employed without the use of the sample rate converter 290 this would mean that a coded picture line does not fit in one memory column. However, by the use of the sample rate converter 290 it is achieved that the coded picture lines of 768 coded pixels are converted into coded picture lines of 512 coded pixels, so that a coded picture line can be accommodated in one memory column. This means that during reproduction the height of the representation of the picture stored in the memory 255 substantially corresponds to the height of the picture frames defined in the PAL and NTSC TV standards.

In order to ensure that the ratio between the length and width of the representation of the coded picture stored in the picture memory 255 corresponds to the original ratio it is required to fill only 256 of the 512 columns of the picture memory with picture information. This is possible, for example, by storing only the even or only the odd coded picture lines in the memory 255. However, other methods utilizing interpolation techniques may also be used.

The method of reducing the number of columns in the picture memory employing interpolation techniques yield a picture representation of satisfactory quality. This is in contradistinction to the method in which only a part of the coded picture lines is stored in the columns of the picture memory.

A drawback of interpolation techniques is that they are comparatively intricate and time-consuming, so that they are less suited for use in the simplified picture retrieval and display system. A method which yields pictures of satisfactory quality in a simple manner will be described hereinafter for the case that the picture memory comprises 512×512 memory locations. This method uses the subfile TV/4 with 384×256coded pixels, instead of the subfile TV with 768× 512 coded pixels, for loading the picture memory.

The use of a sample rate converter 20, by means of which the number of pixels per read coded picture line can be reduced and increased, enables the number of pixels per read coded picture line of the subfile TV/4 to be increased from 384 to 512. The 256 available adapted picture lines of 512 coded pixels each are loaded into the memory 255. Thus, 256 columns of 512 memory locations each are filled with picture information. Reading out this information yields an undistorted portrait-size representation, whose height substantially corresponds to the height of the display screen of a PAL or NTSC TV system, and whose quality is substantially better than that of a portrait-size representation obtained on the basis of a coded picture of 768×512 coded pixels whose width is adapted by using only half (256) the available number of 512 coded picture lines.

Figure 30C:
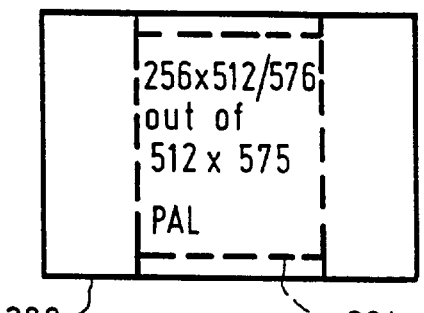
Figure 30D:
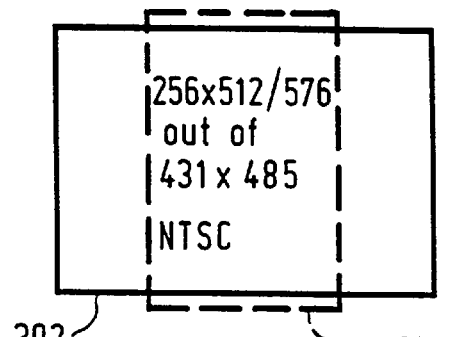

By way of illustration FIG. 30c shows a portrait-size representation 304 of the stored coded picture (of 256×512 coded pixels) thus obtained within the frame 300 defined by the PAL TV standard. The entire representation falls within the frame defined by the PAL standard. FIG. 30d by way of illustration shows a portrait-size representation of the coded picture thus stored. The representation falls largely within the frame 302 defined by the NTSC TV standard.

As will be apparent from the foregoing the use of a sample rate converter 290 enables the use of a picture memory having equal numbers of rows and columns and corresponding substantially to the number of useful picture lines in accordance with the NTSC or PAL standard. This means that both in the case of portrait-size and landscape-size representations of coded pictures the height of the representation substantially corresponds to the number of useful picture lines, so that the display screen will be filled correctly for representations of both types.

What is claimed is:

1. A record carrier disk for storing data for retrieval, said record carrier disk having a recorded data format comprising:
   a) a main data file for storing main data, and
   b) a control data file for storing control data entirely in the form of a plurality of data packets which each consist of n identical control data bit groups, where n is an integer equal to at least 2, for use to control retrieval of said main data.

2. A record carrier disk as claimed in claim 1, characterized in that said main data and said control data are stored according to the same predetermined formatting and encoding rules.

3. A record carrier disk as claimed in claim 1, characterized in that said data packets are arranged in frames,
   said frames are arranged in data blocks of predetermined length,
   each data block comprises a block synchronization section,
   each said frame within a data block starts at a respective predetermined position relative to the respective block synchronization section, and
   each said frame comprises error correction bit groups having a predetermined relation with said control data bit groups in that frame.

4. A record carrier disk as claimed in claim 3, characterized in that each said frame further comprises at least one bit group not containing control data, arranged at the beginning of that frame.

5. A record carrier disk as claimed in claim 4, characterized in that said at least one bit group comprises a plurality of consecutive frame synchronization bit groups which form a pattern which deviates from bit patterns formed by the control data bit groups of that frame.

6. A record carrier disk as claimed in claim 5, characterized in that each of said control data bit groups of a data packet comprises a synchronization bit having one of a plurality of logic values, the logic values of synchronization bits of consecutive control data bit groups alternating with a repetition pattern having a frequency related to the frequency at which said data packets recur.

7. A record carrier disk as claimed in claim 1, characterized in that each of said control data bit groups of a packet comprises a synchronization bit having one of a plurality of logic values, the logic values of consecutive control data bit groups alternating with a repetition pattern having a frequency related to the frequency at which said data packets recur.

8. A method of recording a main data signal for subsequent retrieval from a record carrier disk, and a control data signal used to control the retrieval of said main data on said record carrier disk, said method comprising the steps of:
   a) deriving main data from said main data signal in accordance with a set of predetermined formatting and encoding rules;
   b) deriving control data from said control data signal in accordance with said set of predetermined formatting and encoding rules,
   c) storing said main data as a main data file on said record carrier disk, and
   d) storing said control data on said record carrier disk as a control data file entirely consisting of a plurality of data packets which each consist of n identical control data bit groups, where n is an integer equal to at least 2.

9. A method as claimed in claim 8, characterized in that each of said control data bit groups of a packet comprises a synchronization bit having one of a plurality of logic values, the logic values of the synchronization bits of the consecutive control data bit groups alternating with a repetition pattern having a frequency related to the frequency at which said packets recur.

10. A method as claimed in claim 8, characterized in that each of said control data bit groups of a packet comprises a synchronization bit having one of a plurality of logic values, the logic values of the synchronization bits of the control data bit groups of two successive packets having different values.

11. A method as claimed in claim 8, further comprising:
    arranging said data packets in frames, arranging said frames in data blocks of predetermined length,
    inserting a block synchronization section in each data block, and
    starting each said frame within a data block at a respective predetermined position relative to the respective block synchronization section.

12. A method as claimed in claim 11, further comprising inserting in each said frame error correction bit groups having a predetermined relation with said control data bit groups in that frame.

13. A method as claimed in claim 12, further comprising inserting in each said frame at least one bit group not containing control data, arranged at the beginning of that frame.

14. A method as claimed in claim 11, further comprising inserting in each said frame at least one bit group not containing control data, arranged at the beginning of that frame.

15. A method as claimed in claim 14, characterized in that said at least one bit group comprises a plurality of consecutive frame synchronization bit groups which form a pattern which deviates from bit patterns formed by the control data bit groups of that frame.

16. A device for recording main data and control data on a record carrier disk for subsequent retrieval, said device comprising:
    a) means for receiving a main data signal and a control data signal,
    b) means for deriving main data from said main data signal in accordance with a first set of predetermined formatting and encoding rules;
    c) means for deriving control data, used to control the retrieval of said main data signal from said record carrier, in accordance with said first set of predetermined formatting and encoding rules; and
    d) means for storing said main data on said record carrier disk as a main data file, and storing said control data on said record carrier disk as a control data file which consist entirely of a plurality of data packets each having n identical control data bit groups recorded in succession, where n is an integer equal to at least 2.

17. A device as claimed in claim 16, further comprising means for generating a synchronization bit having one of a plurality of logic values, and means for inserting a synchronization bit having a respective one of said logic values in each of said control data bit groups of a data packet, the logic values of synchronization bits of consecutive control data bit groups alternating with a repetition pattern having a frequency related to the frequency at which said data packets recur.

18. A device as claimed in claim 16, further comprising:
   means for arranging said data packets in frames, and
   means for inserting in each said frame error correction bit groups having a predetermined relation with said control data bit groups in that frame.

19. A device for reading main data and control data recorded on a record carrier disk having a recorded data format comprising a main data file for storing main data and a control data file for storing control data, said control data file consisting entirely of a plurality of data packets each consisting of n identical control data bit groups, where n is an integer equal to at least 2, for use to control retrieval of said main data:
   said device comprising:
   a) means for retrieving main data from files recorded on said record carrier disk, said means including means for deriving a main data signal from main data read from said record carrier disk, in accordance with a first set of predetermined formatting and encoding rules;
   b) means for reading recorded control data, used to control the retrieval of said main data signal from said record carrier disk, in at least one of said identical control data bit groups from each of at least one of said packets,
   c) selecting means for selecting m control data bit groups from each data packet read, where m<n,
   d) means for deriving control data signals from the m selected control data bit groups, in accordance with said first set of predetermined formatting and encoding rules, and
   e) means, responsive to the derived control data signals, for controlling said means for retrieving.

20. A device as claimed in claim 19, characterized in that m=1.

21. A device as claimed in claim 19, for reading data recorded on said record carrier disk, where said data packets are arranged in frames, and said control data file comprises error detection bit groups, characterized in that said means for controlling comprises:
   error detection means, responsive to said error detection bit groups, for detecting errors in the selected control data bit groups, and
   means for repeating read-out of frames having control data bit groups in which errors have been detected.

22. A device as claimed in claim 19, characterized in that said selection means comprises:
   clock extraction means, responsive to one of the signals which is read, for deriving a clock signal having a frequency related to the packet repetition frequency,
   means for synchronizing said clock signals with the data packets read, and
   means for reading in at least one control data bit group per data packet in synchronism with said clock signal.

23. A device as claimed in claim 22, for reading data recorded on said record carrier disk, wherein said data packets are arranged in frames, said frames are arranged in data blocks of predetermined length, and each block contains a block synchronization section,
   characterized in that said means for synchronizing comprises a block synchronization detector, for detecting the block synchronization sections in data blocks accommodating the data of the frames.

24. A device as claimed in claim 22, for reading data recorded on said record carrier disk, wherein said data packets are arranged in frames, and each frame has a frame synchronization bit group at the beginning of the respective frame,
   characterized in that said means for synchronizing comprises a frame synchronization detector for detecting said frame synchronization bit groups.

25. A device as claimed in claim 22, for reading data recorded on said record carrier disk, wherein said control data bit groups contain synchronization bits, characterized in that the clock extraction means comprises means for deriving the clock signal from said synchronization bits, the synchronization bits of consecutive control data bit groups alternating in logic value at a repetition rate related to the packet repetition frequency.

* * * * *